Oct. 13, 1942.    T. J. JUDGE    2,298,946
SWITCH AND SIGNAL CONTROL SYSTEM FOR RAILROADS
Filed April 19, 1940    12 Sheets-Sheet 1
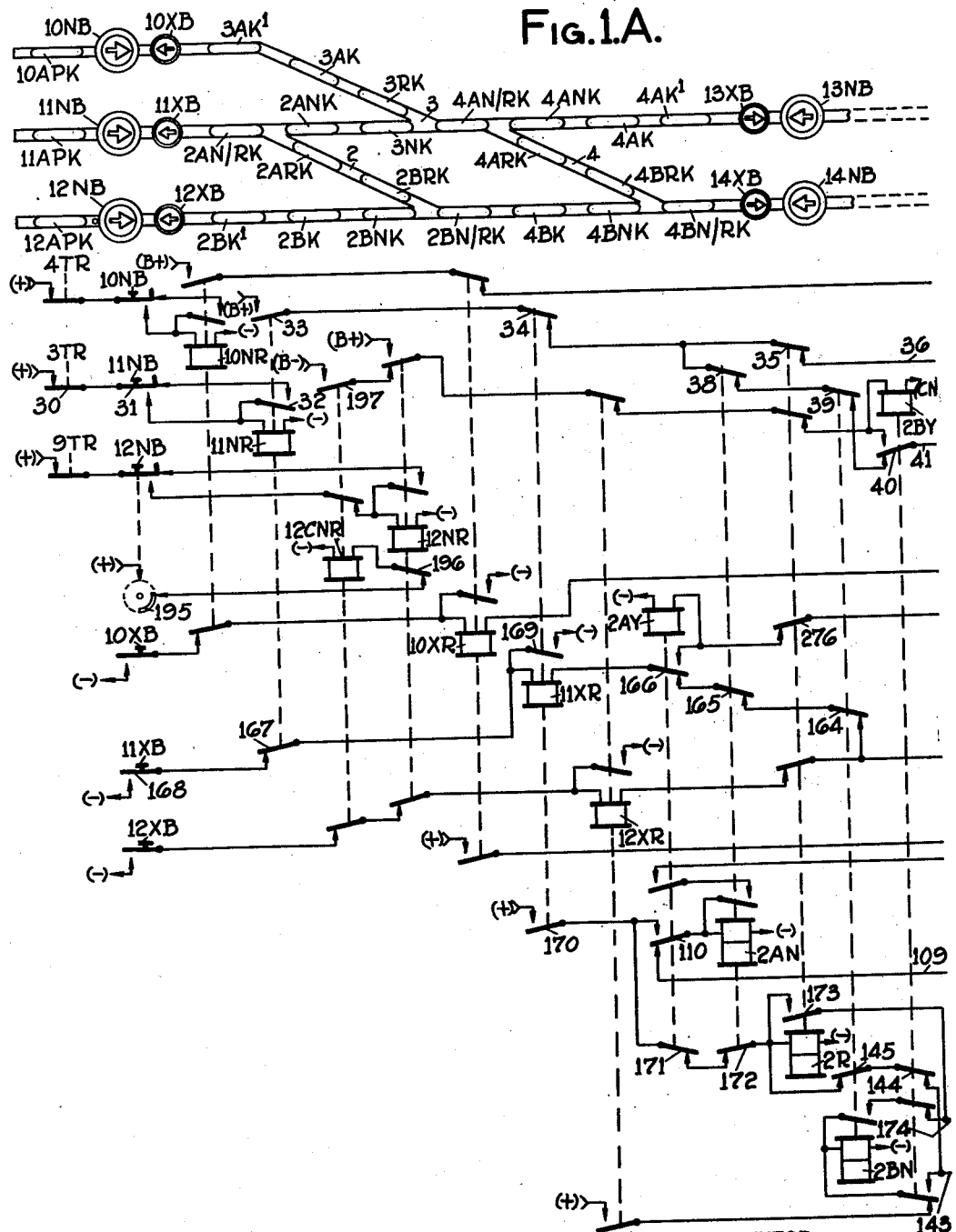
FIG.1.A.
INVENTOR
T. J. Judge,
BY Neil W. Preston,
his ATTORNEY Oct. 13, 1942.   T. J. JUDGE   2,298,946
SWITCH AND SIGNAL CONTROL SYSTEM FOR RAILROADS
Filed April 19, 1940    12 Sheets-Sheet 2
FIG. 1.B.
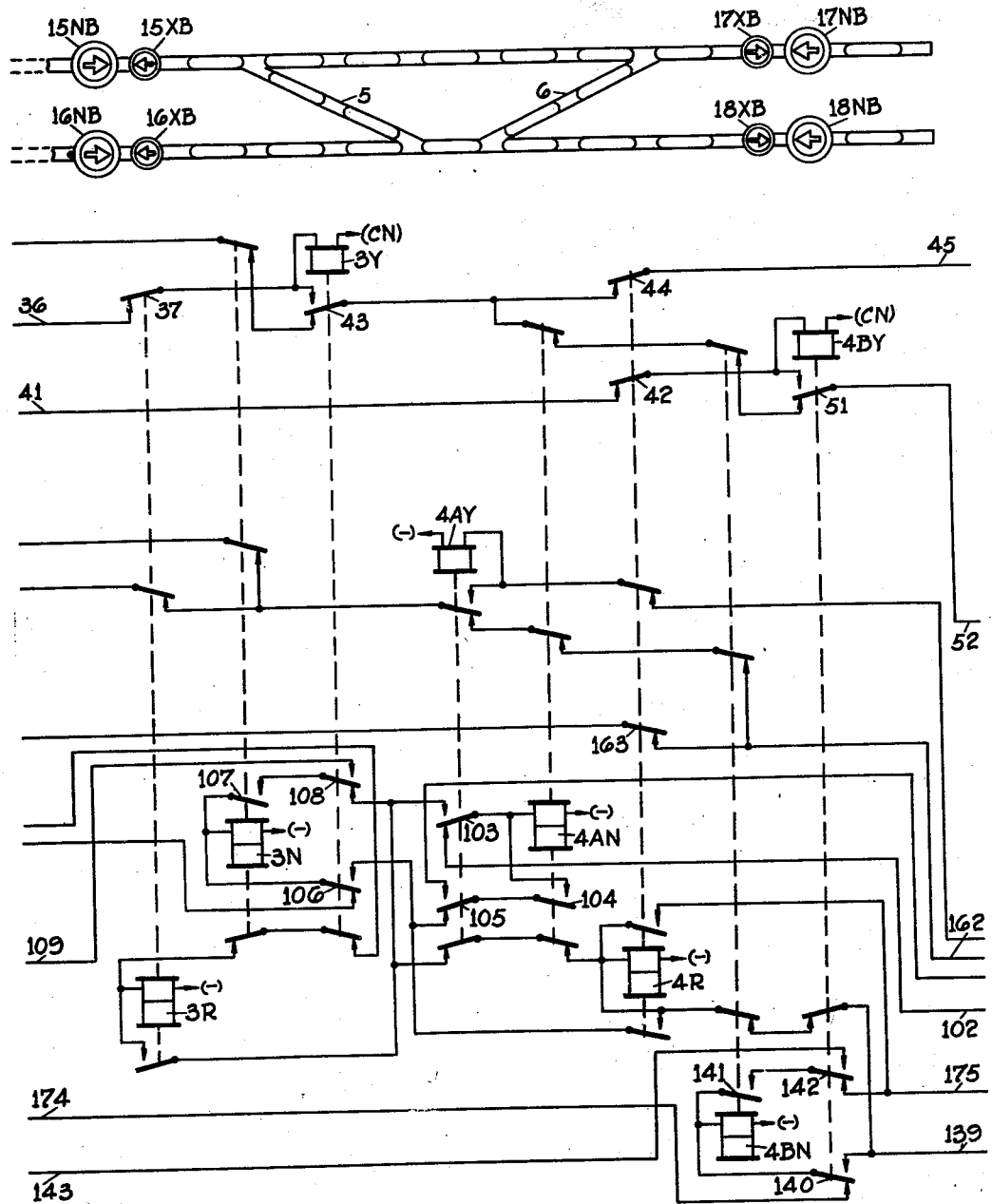

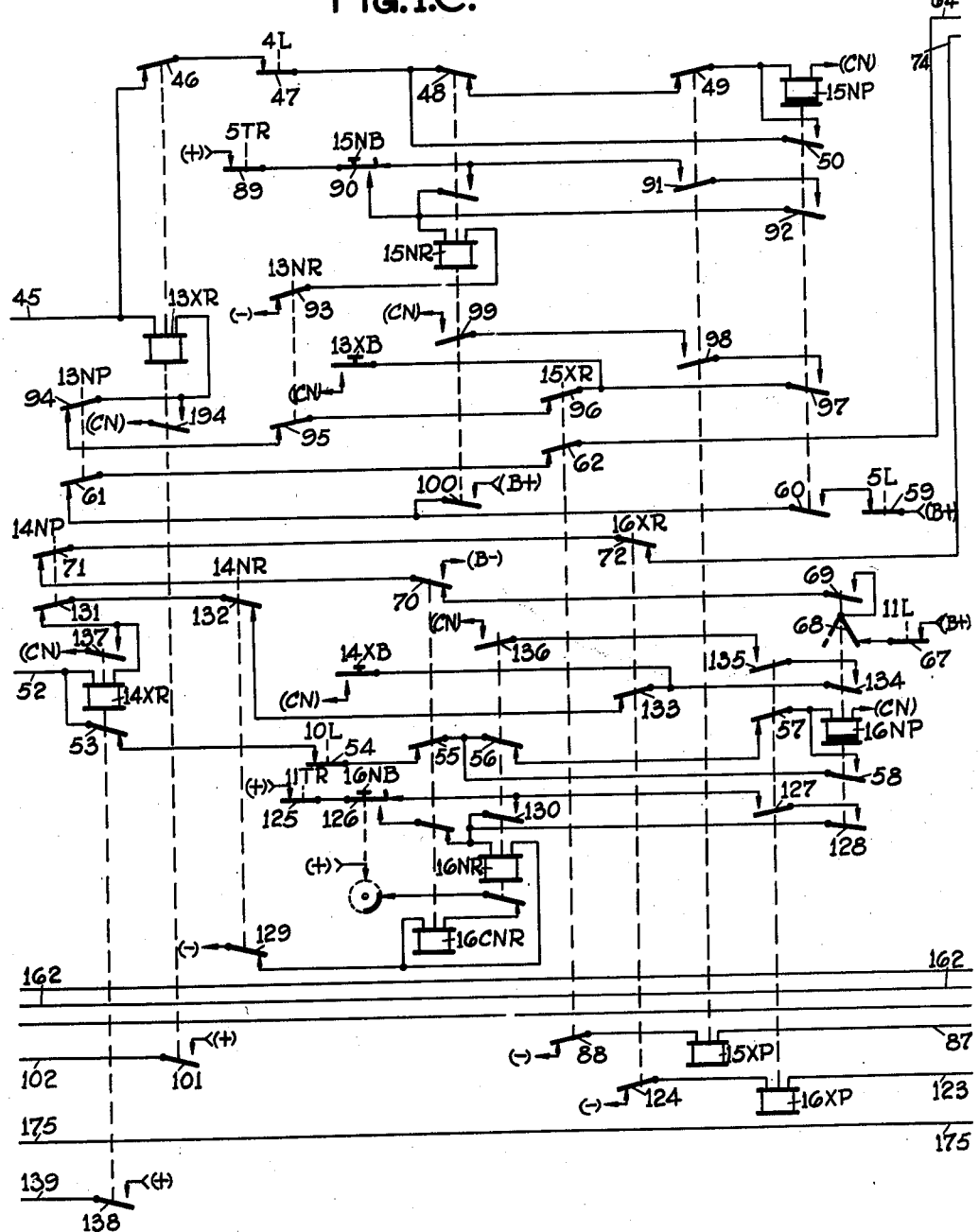

Oct. 13, 1942.　　　T. J. JUDGE　　　2,298,946
SWITCH AND SIGNAL CONTROL SYSTEM FOR RAILROADS
Filed April 19, 1940　　12 Sheets-Sheet 4
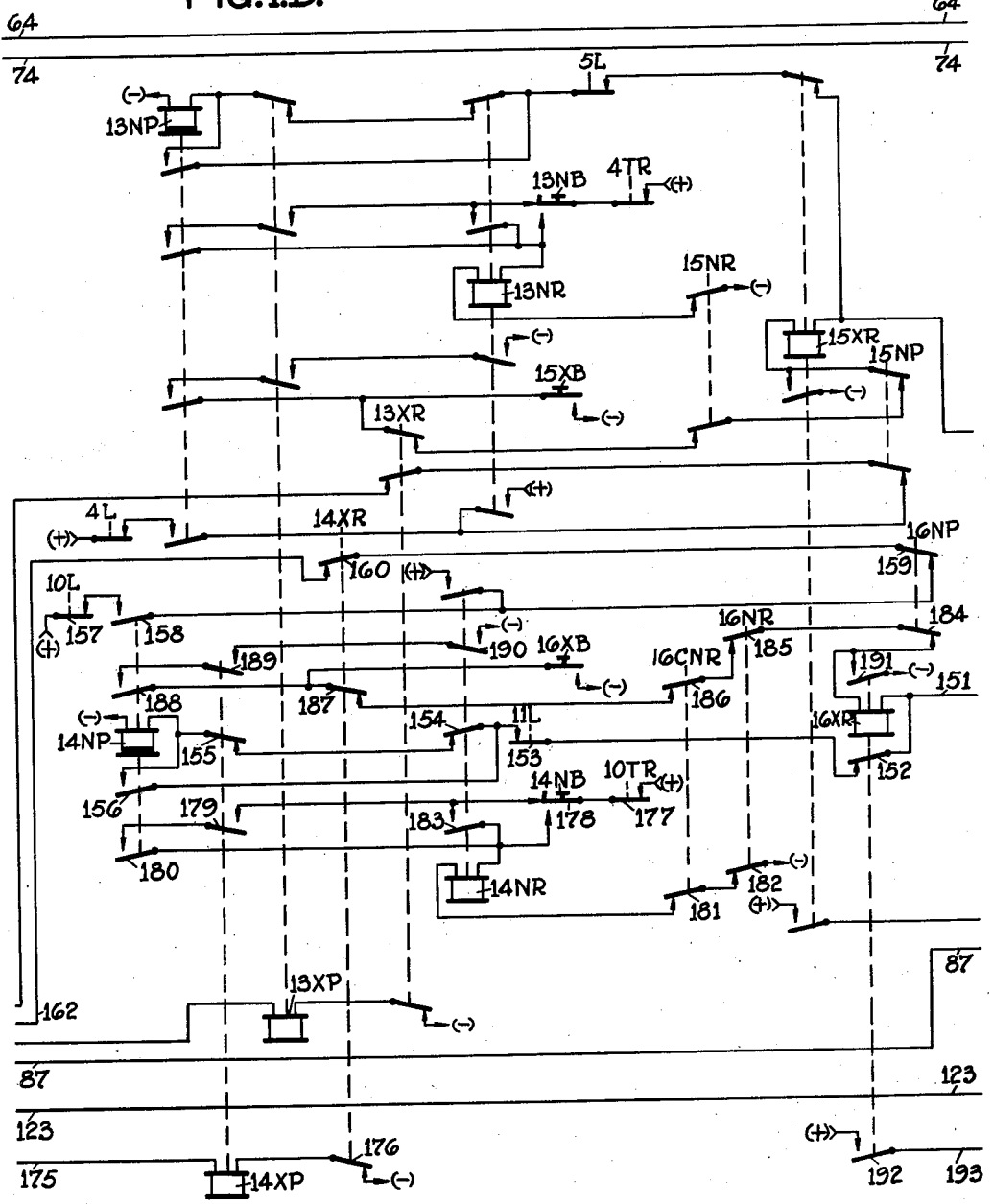
INVENTOR
T. J. Judge,
BY Neil W. Preston,
his ATTORNEY Oct. 13, 1942. T. J. JUDGE 2,298,946
SWITCH AND SIGNAL CONTROL SYSTEM FOR RAILROADS
Filed April 19, 1940 12 Sheets-Sheet 5
FIG. 1.E.
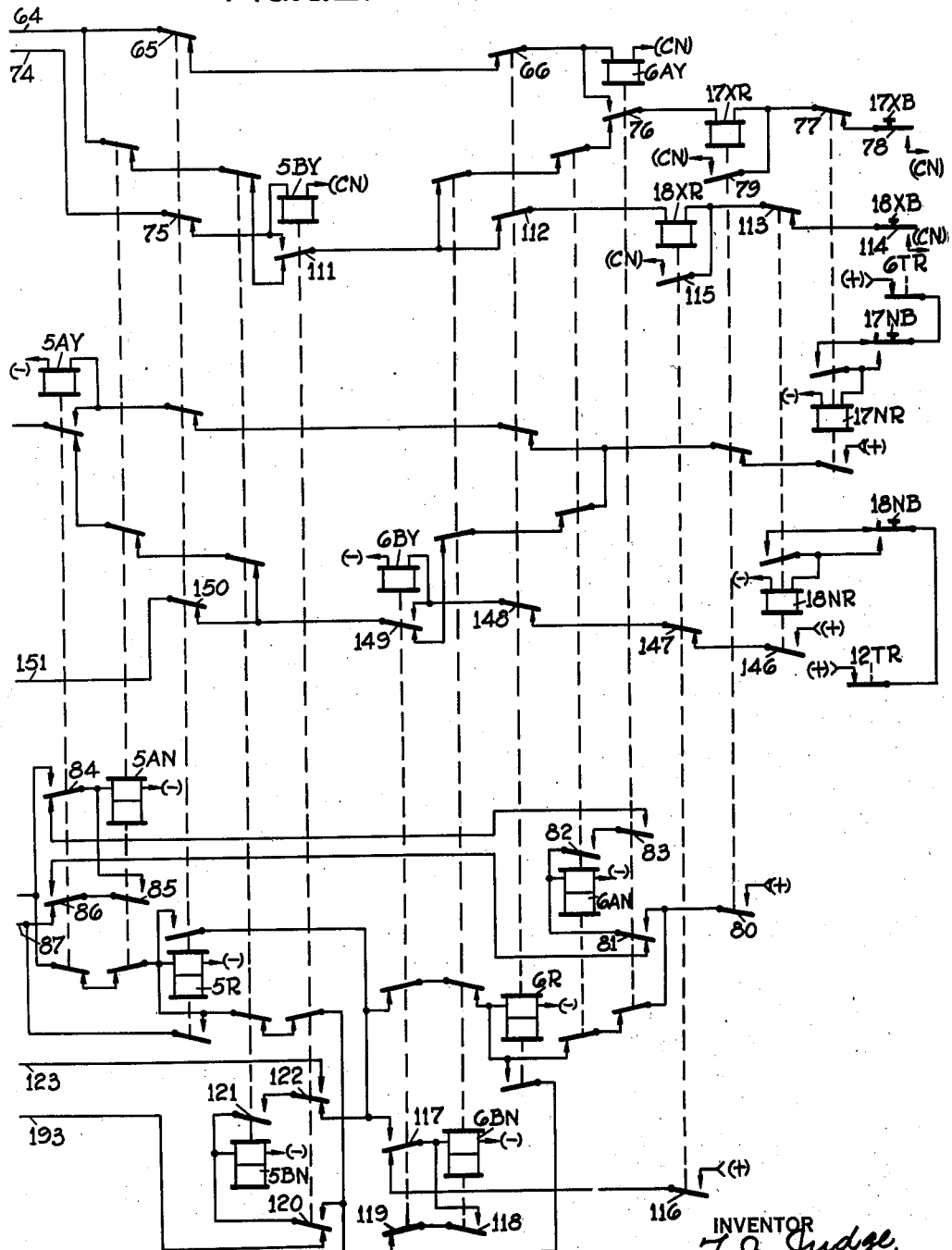
INVENTOR
T. J. Judge.
BY
ATTORNEY

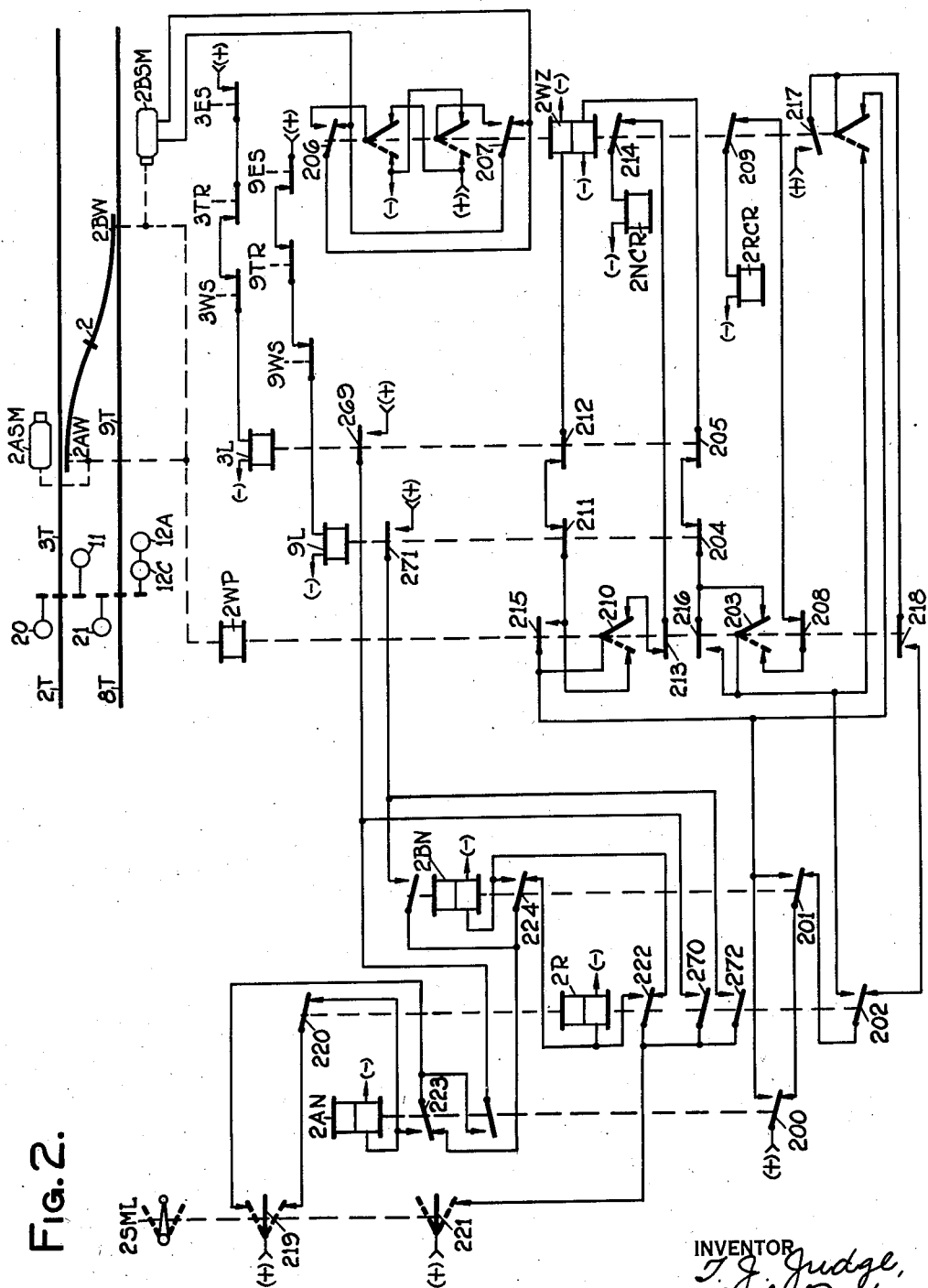

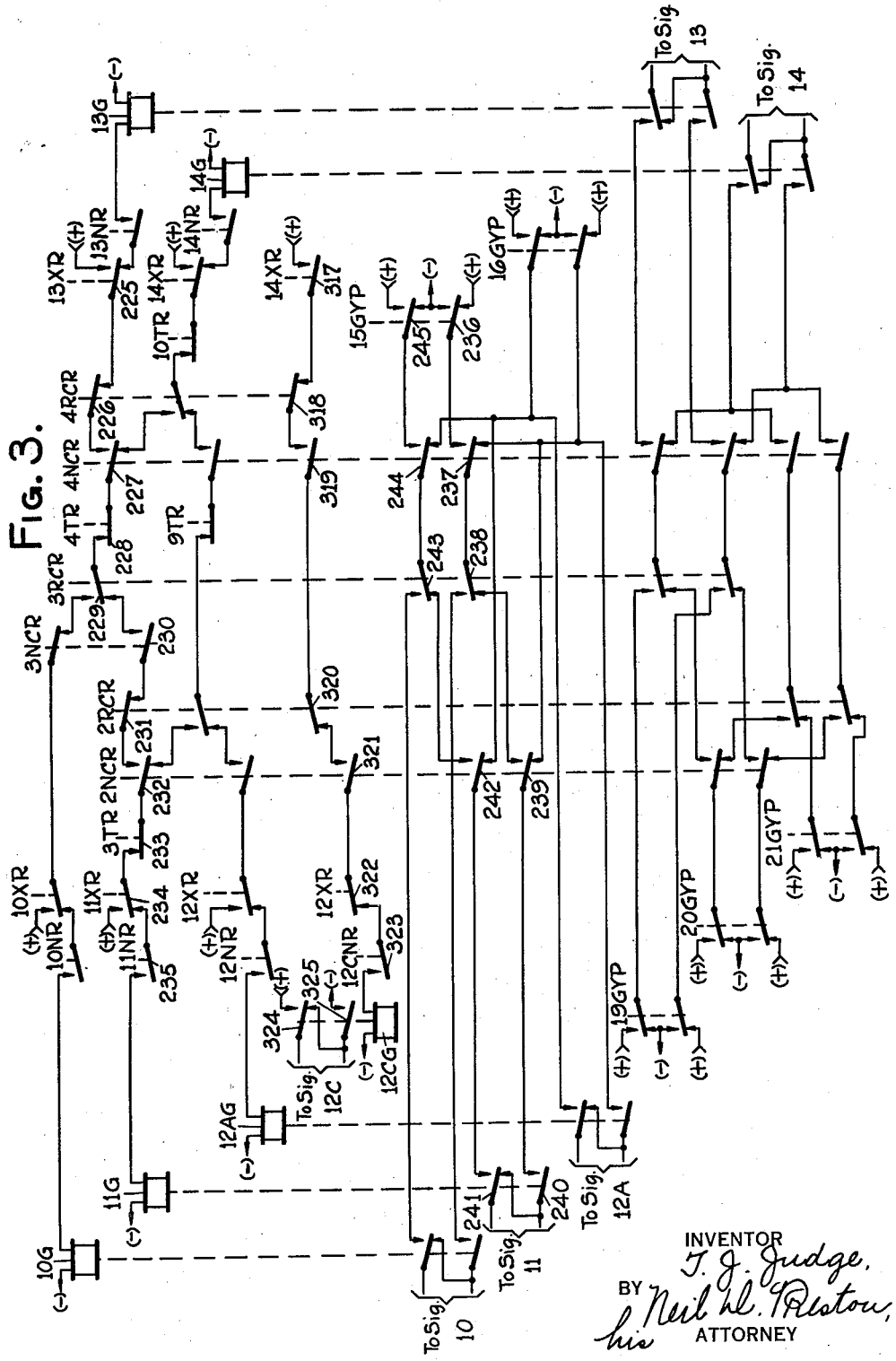

Oct. 13, 1942.   T. J. JUDGE   2,298,946
SWITCH AND SIGNAL CONTROL SYSTEM FOR RAILROADS
Filed April 19, 1940    12 Sheets-Sheet 8
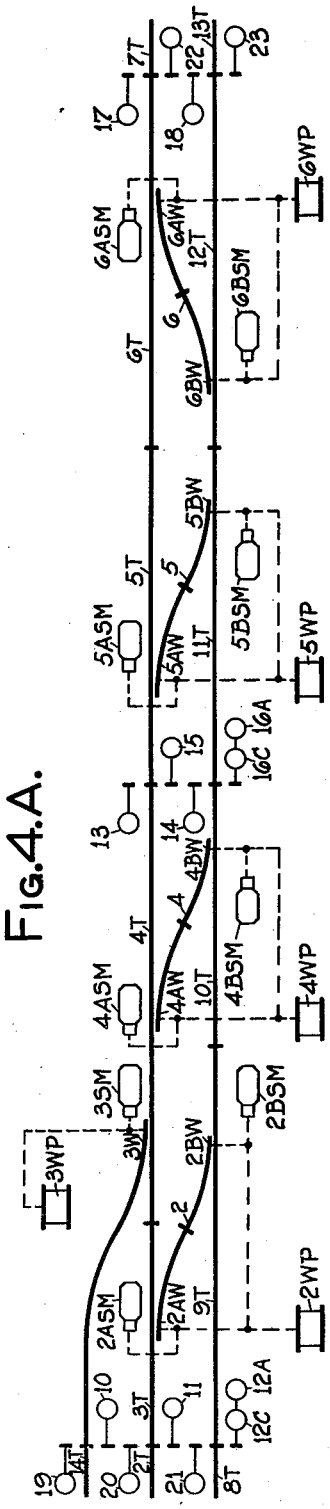
Fig.4.A.
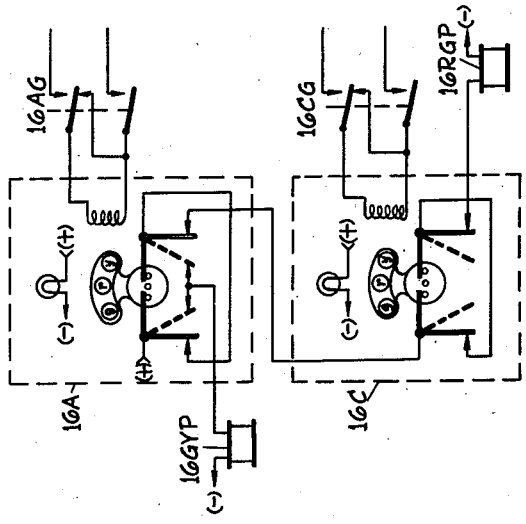
Fig.4.C.
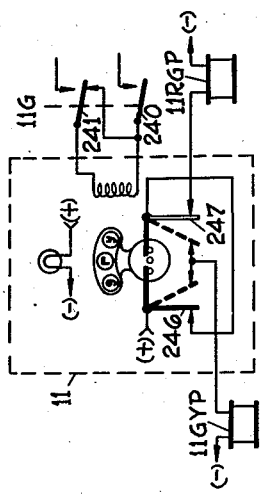
Fig.4.B.
INVENTOR
T. J. Judge,
BY Neil D. Preston,
his ATTORNEY Oct. 13, 1942.   T. J. JUDGE   2,298,946
SWITCH AND SIGNAL CONTROL SYSTEM FOR RAILROADS
Filed April 19, 1940   12 Sheets-Sheet 9

INVENTOR
T. J. Judge,
BY Neil W. Preston,
his ATTORNEY

Oct. 13, 1942. T. J. JUDGE 2,298,946
SWITCH AND SIGNAL CONTROL SYSTEM FOR RAILROADS
Filed April 19, 1940  12 Sheets-Sheet 11

INVENTOR
T. J. Judge,
BY Neil W. Preston,
his ATTORNEY

Oct. 13, 1942.    T. J. JUDGE    2,298,946
SWITCH AND SIGNAL CONTROL SYSTEM FOR RAILROADS
Filed April 19, 1940    12 Sheets—Sheet 12

INVENTOR
T. J. Judge,
BY Neil W. Preston,
his ATTORNEY

Patented Oct. 13, 1942

2,298,946

UNITED STATES PATENT OFFICE 2,298,946

SWITCH AND SIGNAL CONTROL SYSTEM FOR RAILROADS

Thomas J. Judge, Rochester, N. Y., assignor to General Railway Signal Company, Rochester, N. Y.

Application April 19, 1940, Serial No. 330,535

26 Claims. (Cl. 246—134)

This invention relates to switch and signal control systems for railroads, and it more particularly pertains to such systems of the entrance-exit type.

An entrance-exit switch and signal control system is characterized by providing means whereby an operator at a tower or control office can cause the setting up of any desired route by merely the designation by the actuation of control buttons on a miniature track diagram of the respective entrance and exit ends of such route. The ends of the routes constituting the entrance and exit points are generally at signal locations, thus it can be said that a route generally extends from an entering signal to another signal for governing traffic in the same direction. Each of the routes which does not include an intermediate signal is said to be within an "interlocked group," while each of the routes including one or more intermediate signals is said to be a "through route." A through route therefore extends through a plurality of interlocked groups. It is provided in some entrance-exit systems, including the system provided by the present invention, that although each of the through routes can be set up by manipulation of the respective entrance and exit buttons for each of the various interlocked groups in that through route, such through route can also be set up by end-to-end control, that is, by designation of the extreme entrance and exit ends only of that route. In order that an operator can most effectively manipulate the control buttons for the establishment of each of the routes, indications are provided, generally along the track diagram, as to the routes established, the condition of the track switches and signals, and the occupancy of the various track sections.

This invention is to be considered an improvement in the entrance-exit systems disclosed in the prior application of A. Langdon, Ser. No. 119,641, filed January 8, 1937, the patent to A. Langdon, Patent No. 2,148,865, dated February 28, 1939, the prior application of S. N. Wight, Ser. No. 275,923, filed May 26, 1939, and the prior application of N. B. Coley, Ser. No. 328,908, filed April 10, 1940, and no claim is made herein to subject matter shown and described in such prior disclosures. The nature of those prior disclosures and of the system provided by the present invention is such as to provide for the establishment of routes in complex track layouts by the selective energization of switch position selecting relays provided for each of the crossovers and single track switches, there being a definite number of relays required for each of the single track switches and crossovers, irrespective of the number of different routes that can be established thereover. The designation of an entrance point by an operator upon the actuation of the control button on the diagram for such point conditions each of the available routes emanating from that point by the energization of a conditioning relay for each of the track switches that could be trailed in a normal position in an available route emanating from that entrance point. The subsequent designation of an exit point for a route renders effective the selective energization of the switch position selecting relays for the various track switches in that route, in accordance with the conditioning relays, to definitely select the required position for each track switch included in the route to be set up. Although such mode of operation is characteristic of the system provided by the present invention, it is to be understood that various novel features of the present invention can as well be applied to switch and signal control systems having different types of route establishing means provided.

An object of the present invention is to provide an improved system for the display of indications wherein the illumination of linear translucent portions along the miniature track diagram when a route is established forms a relatively continuous line of light corresponding to the established route, such portions being distinctively illuminated when they represent track sections that are occupied by a train.

Another object of the present invention is to provide an improved circuit means for energization of the switch position selecting relays responsive to exit designation. Those relays, according to the present invention, are energized by a circuit network having circuit portions corresponding to various routes through the track layout, such network having feed points corresponding to each of the respective exit points, irrespective of the direction of traffic, and such circuit network being effective to cause the successive energization of the switch position selecting relays responsive to exit designation.

Another object of the present invention is to provide an improved circuit means for preventing the preconditioning of any track switch upon actuation of an auxiliary switch control lever provided for such track switch. That is, such circuit means renders the operation of each of the track switches responsive to the actuation of the auxiliary switch control lever for that track switch, only if such track switch is free to be operated at that time.

Another object of the present invention is to provide an improved circuit arrangement for the establishment of through routes by end-to-end control. In such arrangement an entrance repeater relay is energized responsive to designation of an entrance point by an operator for each of the intermediate signals that can be included in an available route emanating from that designated entrance point. Such entrance repeater relay, in cooperation with an exit repeater relay for that intermediate signal, is effective in the establishment of a through route as if the respective entrance and exit points at such intermediate signal in that through route were designated by an operator.

It is believed that other objects, purposes, and characteristic features of the present invention, due to the complexity of the system, will best be understood upon reference to the accompanying drawings and as they are pointed out at various points throughout the description.

In describing the invention in detail, reference will be made to the accompanying drawings in which like reference characters designate corresponding parts throughout the several illustrations, in which those parts having similar features and functions are designated by like letter reference characters which are generally made distinctive by reason of preceding numerals representative of various switch and signal locations, and in which:

Figs. 1A, 1B, 1C, 1D and 1E, when placed side by side, illustrate the route establishing means provided for the track layout of this embodiment of the present invention, together with a miniature track diagram of such track layout having disposed thereon control buttons for designation of the route ends;

Fig. 2 illustrates in a typical manner circuits incident to the control of the track switches and signals;

Fig. 3 illustrates signal control circuits provided for this embodiment of the present invention;

Figs. 4A, 4B and 4C illustrate the track layout and signals governed by the switch and signal control system for this embodiment of the present invention;

Figure 5:
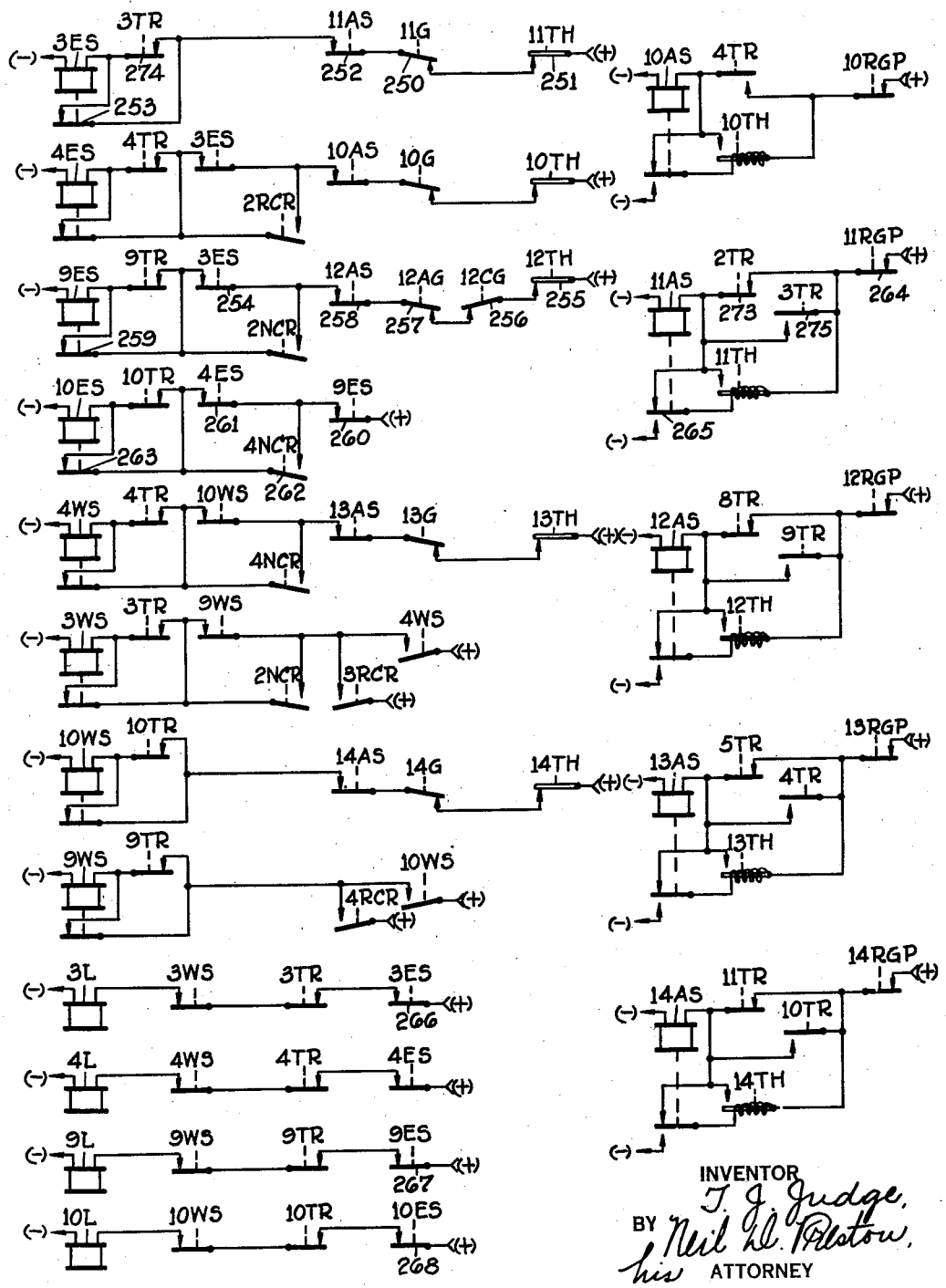
Fig. 5 illustrates a form of electric locking that can be applied to the entrance-exit system provided by the present invention.

The illustrations for disclosure of the present invention have been made in the usual conventional manner to facilitate the disclosure of the present invention as to the mode of operation and the principles involved, rather than for showing the construction and arrangement of parts that is employed in practice. Thus, the various relays and their contacts are illustrated in a conventional manner, and certain contacts and windings of relays are shown in the conventional written circuit form for the purpose of simplifying the illustrations, each of the contacts being readily identified with its relay by the use of reference character of that relay above such contact.

The symbols (+) and (—) are employed to indicate the respective positive and negative terminals of suitable batteries, or other sources of direct current, and the circuits with which those symbols are used always have current flowing in the same direction. The symbols (B+) and (B—) are used to indicate the connections to the opposite terminals of a suitable battery or other direct current source which has a central or intermediate tap designated (CN), and the circuits with which those symbols are used may have current flowing in one direction or the other, dependent upon the particular terminals used in combination with the intermediate tap (CN). The symbols (BX) and (CX) are used to indicate the connections to the respective instantaneous positive and negative terminals of a suitable alternating current source of energy, and the symbol (FBX) is used to indicate a connection through an interrupter to such positive terminal.

Reference is made from time to time during the description of the present invention to the function of parts of the system of a similar nature or class by reference to the letter reference characters common to all of such parts, and such reference is to be considered as applicable to any of the parts of the system illustrated in the drawings which are designated by such letter reference characters together with distinctive preceding numerals.

*Track layout.*—Although the system provided by the present invention is illustrated as applied to a particular track layout, it is to be understood that the system is readily applicable to practically any track layout encountered in railway practice, because of the standard arrangement of circuits provided in a typical manner for each of the various crossovers, single track switches, and route ends.

The track layouts for this embodiment of the present invention has two parallel main tracks interconnected at various points by crossovers to afford a plurality of conflicting and non-conflicting routes, the crossovers 2, 4, 5 and 6 being provided for connecting the two main tracks. A third track is included in the track layout connected to the upper of the two main tracks by a track switch 3W.

Traffic through the track layout is governed by signals of the search light type, such, for example, as the signal disclosed in the patent to O. S. Field, Patent No. 1,835,150, dated December 8, 1931. The signals 10, 11 and 12A and 12C are provided for governing east bound traffic to the right through the left hand interlocked group in the track layout, and signals 15, 16A and 16C are provided for governing east bound traffic to the right through the right hand interlocked group. The signals 17 and 18 are provided for governing west bound traffic to the left through the right hand interlocked group, and the signals 13 and 14 are provided for governing west bound traffic to the left through the left hand interlocked group. The signals 19, 20, 21, 22 and 23 govern traffic out of the track layout of this embodiment of the present invention, and can be either signals of adjacent interlocked groups or can be automatic signals governing traffic out of the track layout illustrated. The signals are all assumed to be of the three indication type having red, yellow and green color light indications for the respective stop, proceed-with-caution, and proceed indications, except the low speed call-on signals 12C and 16C which provide only red and yellow color light indications for stop and proceed-with-caution indications. Although signals of the search light type have been used in this embodiment of the present invention it is desired to be understood that other types of signals such as color light signals each having individual color lamp units, position light signals, and semaphore signals could as well be used, and it is also to be understood that various different arrangements of signals and various other types of signal indications, and signal control means can be used with the system provided by the present invention.

The track switches are positioned by power switch machines of a suitable type, such, for example, as the switch machines shown in the patent to W. K. Howe, Patent No. 1,466,903, dated September 4, 1923. If an electric switch machine such as the one disclosed in that patent is used for the power operation of each of the track switches, such switch machine has its motor controlled in a suitable manner to provide over-load protection and other features generally employed in practice in the control of switch machine motors such, for example, as is shown in the patent to W. H. Hoppe et al., Patent No. 1,877,876, dated September 20, 1932.

A polar neutral switch repeater relay WP is provided for each of the crossovers and each of the single track switches in the track layout for the purpose of repeating the locked position of such single track switch or the track switches of the crossover with which it is associated in the usual manner, such relay being energized with one polarity when the track switch or track switches with which it is associated are in their normal locked positions, and being energized with the opposite polarity when such track switch or track switches are in their reverse positions. Each of the relays WP is deenergized during operation of the track switch or track switches with which it is associated.

The track layout is divided into track sections in the usual manner, and a track circuit (not shown) is provided in the usual manner for each of such track sections for the control of a track relay TR associated therewith.

*Control machine.*—The control machine provided in the tower or control office for this embodiment of the present invention has a control panel upon which is a miniature track diagram corresponding to the track layout illustrated in Fig. 4A constructed as shown in Figs. 1A and 1B, such track layout being made up principally of linear translucent inserts in the control panel spaced a short distance apart end-to-end. Each of the inserts has a red and a white miniature lamp secured to the back of the panel in the rear thereof for its illumination. An entrance button NB and an exit button XB is provided for each of the route ends, as traffic is provided through the track layout in both directions. The entrance and exit buttons are disposed on the track diagram at points representative of the signal locations at the track layout which constitute such route ends. Each of the entrance buttons NB has included therein a lamp socket for receiving a red and a green miniature lamp so as to provide for the red or green illumination of the direction arrow on the face of such button.

Each of the entrance buttons NB is of the push-pull type being biased to a normal position from which it can either be depressed or pulled out. The depression of the button is used for designation of that entrance point for a route to be established, and the pulling out of that button is used for designation of restoration for a route having an entrance point at that signal location. As a means for designating a low speed call-on signal as distinguished from a high speed signal for a given signal location, it is provided that the entrance button NB can be rotated to a distinctive operating position for designation of such call-on signal. Therefore, the buttons 12NB and 16NB can be rotated in a counter clockwise direction for designation of the call-on signals at such respective entrance points. The structure of a control button to provide such distinctive operating positions can be provided, for example, as shown in the prior application of J. F. Merkel, Ser. No. 158,720, filed August 12, 1937.

Each of the exit buttons XB is of the self-restoring type having a contact associated therewith closed only when such button is depressed from its normal position.

Although separate buttons are provided for designation of the respective entrance and exit points for each of the route ends, it is to be understood that the contacts of such buttons can be combined into a single button having the required number of distinctive positions, and that a single button can also be used for each of the route ends if circuit means is provided associated therewith for supplying the distinctive conditions of entrance and exit designation, dependent, for example, upon the sequence of operation of the control buttons for the designation of the respective entrance and exit ends of the various routes as shown in the prior application of S. N. Wight, Ser. No. 328,907, filed April 10, 1940.

An auxiliary switch control lever SML is provided on the control panel for each of the crossovers and each of the single track switches in order to facilitate the operation of the track switches to free them of obstructions such as snow and ice, and to provide an auxiliary means for the establishment of routes through the track layout. Each of the auxiliary switch control levers SML has a normal center position and two operating positions, one for operation of the track switch or track switches with which it is associated to normal positions, and the other for operation of such track switch or track switches to reverse positions.

*System devices.*—An entrance relay NR is provided for each of the entrance points, and such relay is picked up responsive to entrance designation for that point, and is maintained energized, dependent for restoration upon manual designation of such restoration by an operator, or upon passage of a train past such entrance point.

An exit relay XR is provided for each of the exit points, and such relay is energized responsive to exit designation, dependent upon the designation of an entrance point for an available route extending to that exit point. Such exit relay, when energized, is dependent for deenergization upon the restoration of the entrance relay NR for the entrance end of the route which has been designated.

A conditioning relay Y is provided for each of the track switches, and such relay is energized whenever an entrance relay NR is energized for the entrance point to an available route extending over that track switch in a normal position. The selective energization of the conditioning relays Y closes circuit portions to condition the exit relays XR for energization.

Normal switch position selecting relays N, AN and BN and reverse switch position selecting relays R are provided for selecting the positions for the track switches required for the establishment of the various routes through the track layout. A relay AN is provided for the upper end for each of the crossovers, and a relay BN is provided for the lower end for each of the crossovers, the energization of either of such relays being effective to cause the operation of both of the track switches of that crossover to normal positions. The switch position selecting relays are selectively energized responsive to the picking up of an exit relay XR in the establishment of a route in accordance with the positions of the track switches required for such route, the conditioning relays Y for the track switches in that route being effective to select for energization normal or reverse switch position selecting relays for certain of the track switches.

For the establishment of routes by end-to-end control, a through route relay NP and an exit repeater XP are provided for each of the intermediate signals that can be included in a through route. Each of the relays NP is energized responsive to entrance designation if that intermediate signal can be included in an available route extending from such designated entrance point, except when that entrance point has been designated to be governed by a call-on signal. Each of the exit repeater relays XP is energized when that intermediate signal location is at the entrance end of a route established in advance of such signal.

A polar neutral relay WZ is provided for each of the crossovers and each of the single track switches to provide desirable switch control features such, for example, as a means for reversing a track switch in mid-stroke, such relay being energized responsive to the energization of a switch position selecting relay for that crossover or single track switch, only if the track switches of that crossover or that single track switch are out of correspondence with the position called for by the switch position selecting relays.

Correspondence relays NCR and RCR are provided for each of the crossovers and each of the single track switches, and one or the other of such relays is energized when a route has been selected over its crossover or single track switch if such track switch or track switches have been operated to correspond with the required positions. Such relays when energized close portions of the control circuits for the signals to provide that each of the signals can be cleared only when a route has been completely established extending from that signal location.

A lock relay L is provided for each of the detector track sections, and such relay has its control circuit dependent upon ES and WS route locking relays, which in turn have their control circuits depend upon approach and time locking relays AS.

Having thus considered the general purposes of the apparatus provided for this embodiment of the present invention, it is believed that the mode of operation of the system and principles involved can best be understood upon reference to certain specific typical operating conditions of the system.

*Operation*

As a basis of consideration of various typical operating conditions of the system, certain conditions are assumed as normal. The normal conditions of the system as illustrated are said to exist when the indicator lamps on the track diagram are dark to indicate that there are no routes established through the track layout, or partially established, that the signals are all at stop, and that each of the track sections in the track layout is unoccupied by a train. The track switches under normal conditions are in their normal positions because it is assumed that the last routes to be established through the track layout required such track switches in those positions. The relays associated with the means provided for the automatic selection of the routes responsive to the entrance and exit designation are all normally deenergized, and only those relays associated with the track circuits and the locking such as the relays WP, TR, L, ES, and WS (see Figs. 2 and 5) are normally energized.

*Route establishment.*—The circuits for the relays associated with the selecting of each of the routes are provided in the form of circuit networks (see Figs. 1A, 1B, 1C, 1D and 1E), there being a circuit network conveniently called an "initiating circuit network" for each of the interlocked groups for each direction of traffic, and a circuit network conveniently called a "completion circuit network" for each of the interlocked groups for both directions of traffic.

Each of the initiating circuit networks has circuit portions corresponding to the various track portions at the track layout, and the organization of the circuits is such that feed points for such circuit network are provided at points corresponding to the entrance ends of the routes, and the energization of an entrance relay NR responsive to entrance designation can cause energy to feed through each of the circuit portions of the initiating network provided for that direction of traffic, only so far as such circuit portion corresponds to a route in the track layout which is available for use. Included in each of the initiating circuit networks is a conditioning relay Y for each of the track switches connected in the circuit network in such a manner that such relay can be energized only when there is an available route extending from a designated entrance point over that track switch in a normal position.

The completion circuit network is provided for the energization of the switch position selecting relays N, AN, BN and R, and such circuit network is energized dependent upon the energization of the various exit relays, such circuit network having feed points at its ends corresponding to the various exit points for both directions of traffic.

Upon designation of the entrance end of a route to be established, a conditioning relay Y is energized for each of the track switches that can be trailed in a normal position in an available route emanating from that point within that interlocked group, and an entrance repeater relay NP is also energized for each of the intermediate signals that can be included in an available through route emanating from the entrance point designated, except when such entrance point has been designated to be governed by a call-on signal. The energization of such an entrance repeater relay provides a feed point for the initiating circuit network for that direction of traffic for the interlocked group for which such intermediate signal is provided, and provides for the energization of the conditioning relays Y for the track switches in the various available routes within that interlocked group. Such mode of operation continues past each of the intermediate signals in the track layout so far as the system of end-to-end control is provided, to condition each of the available routes emanating from the entrance point which has been designated.

To consider an example of such mode of operation, assume that an operator designates an entrance point at 11 by the depression of the entrance button 11NB at a time when the conditions of the system are normal. The depression of such button causes the energization of the initiating circuit network for that direction of traffic to cause the picking up of the relays 3Y and 4BY because the track switches with which those relays are associated are trailed in normal positions. Upon the picking up of relay 3Y the through route entrance repeater relay 15NP is energized, and the picking up of that relay applies energy to the initiating circuit network for the right hand interlocked group to cause the energization of the relay 6AY. The picking up of relay 4BY causes the picking up of the through route entrance repeater relay 16NP, and that relay in picking up applies energy to the initiating circuit network to cause the energization of the relay 5BY.

When the relay 6AY is picked up, energy feeds to the exit relay 17XR to condition that relay so that it can be picked up upon designation of that exit point by the depression of button 17XB. In a similar manner, the picking up of the relay 5BY closes a circuit to condition the relay 18XR so that such relay can be picked up if an operator designates that exit point by the depression of the exit button 18XB. It is also provided that each of the exit relays 13XR and 14XR is conditioned for energization in a similar manner so that an operator can designate either of those exit points and cause the establishment of a route extending only up to the intermediate signals, if he desires such route only to extend that far.

If after designation of an entrance point at 11, an operator designates the exit point at 17 by the depression of button 17XB, the picking up of relay 17XR causes the successive energization of relays 6AN and 5AN, the relay 6AN being selected in preference to the relay 6R because of the energized condition of the conditioning relay 6AY associated with the track switch at that end of the crossover. The picking up of relay 5AN causes the picking up of the exit repeater relay 15XP, and the picking up of that relay causes the energization respectively of relays 15NR and 13XR. The picking up of relay 13XR causes the dropping away of the entrance repeater relay 15NP as a feed point is established for the initiating circuit network for the right hand interlocked group upon the picking up of relay 15NR, and the dropping away of the relay 15NP provides that the exit relay 17XR is maintained energized dependent upon the entrance relay 15NR for the intermediate signal, irrespective of the designated entrance point.

When the relay 13XR is picked up, the relays 4AN, 3N and 2AN are successively energized to complete the selection of the normal positions for each of the crossovers and the single track switch included in the route extending from 11 to 17. Each of those switch position selecting relays when energized causes the energization of the switch control relay WZ for that crossover or single track switch to effect the operation of the switch machine or machines, if such crossover or single track switch is out of correspondence with the position called for by the route selected. If the track switches of any of the crossovers or the single track switch are in correspondence with the position called for in the route under consideration, the relay WZ for such crossover or single track switch remains deenergized.

After the track switches have been operated to their required positions to set up the route from 11 to 17, the signals governing traffic through the respective interlocked groups included in that through route are cleared after their circuits have been closed by the energization of correspondence relays for the various track switches included in the route governed by such signals.

To consider specifically, the circuits which provide the above described mode of operation, with reference to Fig. 1A, the depression of button 11NB causes the picking up of the relay 11NR by the energization of a circuit closed from (+), including front contact 30 of the track relay 3TR, contact 31 of button 11NB closed in a depressed position, and winding of relay 11NR, to (−). The picking up of that relay closes a stick circuit extending from (+), including front contact 30 of relay 3TR, contact 31 of button 11NB, front contact 32 of relay 11NR, and winding of relay 11NR, to (−). When that relay is picked up, the relay 3Y is picked up by the energization of a circuit closed from (B+), including front contact 33 of relay 11NR, back contact 34 of relay 11XR, back contact 35 of relay 2R, wire 36, back contact 37 of relay 3R, and winding of relay 3Y, to (CN). Energy also feeds from front contact 33 of relay 11NR to cause the picking up of relay 4BY over a circuit extending from (B+), including front contact 33 of relay 11NR, back contact 34 of relay 11XR, back contact 38 of relay 2AN, back contact 39 of relay 2BN, back contact 40 of relay 2BY, wire 41, back contact 42 of relay 4R, and winding of relay 4BY, to (CN).

The relay 15NP is picked up subsequent to the energization of relay 3Y by the energization of a circuit closed from (B+), including front contact 33 (see Fig. 1A) of relay 11NR, back contact 34 of relay 11XR, back contact 35 of relay 2R, wire 36, back contact 37 of relay 3R, front contact 43 of relay 3Y, back contact 44 of relay 4R, wire 45, back contact 46 of relay 13XR, front contact 47 of relay 4L, back contact 48 of relay 15NR, back contact 49 of relay 15XP, and winding of relay 15NP, to (CN). The picking up of that relay closes a stick circuit at front contact 50 to shunt contacts 48 and 49 out of the circuit just described. Likewise, the relay 16NP is picked up in accordance with the energization of the relay 4BY, by the energization of a circuit closed from (B+), including front contact 33 of relay 11NR (see Fig. 1A), back contact 34 of relay 11XR, back contact 38 of relay 2AN, back contact 39 of relay 2BN, back contact 40 of relay 2BY, wire 41, back contact 42 of relay 4R, front contact 51 of relay 4BY, wire 52, back contact 53 of relay 14XR, front contact 54 of relay 16L, back contact 55 of relay 16CNR, back contact 56 of relay 16NR, back contact 57 of relay 16XP, and winding of relay 16NP, to (CN). The picking up of relay 16NP closes a stick circuit at front contact 58 to shunt contacts 56 and 57 out of the circuit just described.

Energy is applied to the initiating network for east bound traffic for the right hand interlocked group upon the picking up of the through route relay 16NP to cause the energization of relay 6AY by a circuit closed from (B+), including front contact 59 of relay 5L, front contact 60 of relay 16NP, back contact 61 of relay 13NP, back contact 62 of relay 15XR, wire 64, back contact 65 of relay 5R, back contact 66 of relay 6R, and winding of relay 6AY, to (CN). The relay 5BY is energized upon the picking up of the relay 16NP by a circuit closed from (B+), including front contact 67 (see Fig. 1C) of relay 11L, polar contact 68 of relay 16NP in a right hand position, front contact 69 of relay 16NP, back contact 70 of relay 16CNR, back contact 71 of relay 14NP, back contact 72 of relay 16XR, wire 74, back contact 75 of relay 5R, and winding of relay 5BY, to (CN).

Upon considering the circuits just described, it is believed to be obvious that the depression of the exit button for either of the exit points at 13, 14, 17 or 18 would cause the picking up of the exit relay XR for that exit point. Assuming, for example, the operator to designate the exit point at 17 for the through route extending from 11 to 17, the relay 17XR is picked up upon the depression of the button 17XB by the energization of a circuit closed from (B+), including front contact 59 (see Fig. 1C) of relay 5L, front contact 60 of relay 16NP, back contact 61 of relay 13NP, back contact 62 of relay 15XR, wire 64, back contact 65 of relay 5R, back contact 66 of relay 6R, front contact 76 of relay 6AY, winding of relay 17XR, back contact 77 of relay 17NR, and contact 78 of button 17XB, closed in a depressed position, to (CN). The picking up of that relay closes a stick circuit at front contact 79 to shunt contacts 77 and 78 out of the circuit just described.

The picking up of relay 17XR causes the picking up of relay 6AN (because such relay is selected in accordance with the energized condition of relay 6AY) by the energization of a circuit closed from (+), including front contact 80 of relay 17XR, front contact 81 of relay 6AY, and upper winding of relay 6AN, to (—). When relay 6AN is picked up, a circuit is closed to cause the picking up of relay 5AN extending from (+), including front contact 80 of relay 17XR, front contact 81 of relay 6AY, front contact 82 of relay 6AN, front contact 83 of relay 6AY, back contact 84 of relay 5AY, and upper winding of relay 5AN, to (—). The picking up of relay 5AN completes the selection of the positions for the track switches included in the right hand interlocked group, and the picking up of such relay causes the energization of the relay 15XP by a circuit extending from (+), including front contact 80 (see Fig. 1E) of relay 17XR, front contact 81 of relay 6AY, front contact 82 of relay 6AN, front contact 83 of relay 6AY, back contact 84 of relay 5AY, front contact 85 of relay 5AN, back contact 86 of relay 5AY, wire 87, winding of relay 15XP, and back contact 88 of relay 15XR, to (—). It will be noted that the relay 15XP when picked up by the energization of that circuit is maintained energized as long as relay 17XR is picked up.

Relay 15NR is picked up responsive to the picking up of relay 15XP by the energization of a circuit closed from (+), including front contact 89 of relay 5TR, normally closed contact 90 of button 15NB, front contact 91 of relay 15XP, front contact 92 of relay 15NP, winding of relay 15NR, and back contact 93 of relay 13NR, to (—). When relay 15NR is picked up, a circuit is closed to cause the picking up of the exit relay 13XR extending from (B+), including front contact 33 (see Fig. 1A) of relay 11NR, back contact 34 of relay 11XR, back contact 35 of relay 2R, wire 36, back contact 37 of relay 3R, front contact 43 of relay 3Y, back contact 44 of relay 4R, wire 45, winding of relay 13XR, back contact 94 of relay 13NP, back contact 95 of relay 13NR, back contact 96 of relay 15XR, front contact 97 of relay 15NP, front contact 98 of relay 15XP, and front contact 99 of relay 15NR, to (CN). A stick circuit is closed upon the picking up of that relay at front contact 194 to maintain that relay energized, dependent upon the entrance relay 11NR. The picking up of relay 13XR opens the stick circuit for relay 15NP at back contact 46 and causes that relay to be dropped away. Relay 15NP is made slightly slow in dropping away to insure the establishment of the stick circuit for relay 13XR. Energy is provided, however, by front contact 100 of relay 15NR to maintain the circuits energized for relays 6AY and 17XR.

Relay 4AN is energized upon the picking up of relay 13XR by a circuit closed from (+), including front contact 101 of relay 13XR, wire 102, back contact 103 of relay 4AY, and upper winding of relay 4AN, to (—). Relay 3N is energized upon the picking up of relay 4AN by a circuit closed from (+), including front contact 101 (see Fig. 1C) of relay 13XR, wire 102, back contact 103 of relay 4AY, front contact 104 of relay 4AN, back contact 105 of relay 4AY, front contact 106 of relay 3Y, and upper winding of relay 3N, to (—). Relay 2AN is energized upon the picking up of relay 3N by a circuit closed from (+), including front contact 101 (see Fig. 1C) of relay 13XR, wire 102, back contact 103 of relay 4AY, front contact 104 of relay 4AN, back contact 105 of relay 4AY, front contact 106 of relay 3Y, front contact 107 of relay 3N, front contact 108 of relay 3Y, wire 109, back contact 110 of relay 2AY, and upper winding of relay 2AN, to (—). The picking up of relay 2AN completes the selection of the route from 11 to 17, and the energization of a normal switch position selecting relay N or AN for each of the single track switches and crossovers causes the power operation of the track switches to establish the route which has been selected.

It will be noted upon consideration of the circuits that have been described that the picking up of relay 2AN in the establishment of the route from 11 to 17 causes the dropping away of relays 4BY and 16NP by opening the circuits for such relays at back contact 38, and the dropping away of relay 16NP causes the dropping away of relay 5BY by opening the circuit for that relay at front contact 69. Such mode of operation is in accordance with the principles of the system as heretofore set forth in that NP and Y relays are energized only for intermediate signals and track switches that can be included in an available route emanating from a designated entrance point. The picking up of relay 2AN of course renders conflicting routes extending over crossover 2 unavailable. The deenergization of such relays of course also provides that the exit relays 14XR and 18XR are no longer conditioned so that they can be energized upon exit designation.

With reference to the circuit described for the energization of relay 15NP, it will be noted that the inclusion of front contact 47 of the lock relay 4L in the circuit provides that relay 15NP cannot be picked up for the setting up of a through route if the electric locking is effective for the track switches included in track section 4T, such electric locking being hereinafter considered more in detail. The feeding of energy through the initiating circuit network for east bound traffic for the right hand interlocked group responsive to the picking up of relay 15NP is dependent upon the closed condition of front contact 59 of relay 5L, and thus provides that through route control cannot be effective past the intermediate signal 15 if the electric locking is effective for the track switches associated with the track section 5T. The inclusion of back contact 49 of relay 15XP in the pick-up circuit for relay 15NP insures the dropping away of relay 17XR (when a route is established as has been described) before the relay 15NP can be picked up responsive to entrance designation for the establishment of another route. The utility of such a circuit arrangement will be more clearly understood when the restoration to normal of the parts of the system associated with an established route is hereinafter considered.

If, after designating an entrance point at 11, an operator designates an exit point at 18, the available route extending between 11 and 18 is selected which diverges nearest the designated entrance point. If the normal conditions of the system exist prior to the designation of those points, the route selected will be via crossover 2. However, if a west bound train, for example, occupies track section 9T, with the track switches of crossover 2 in their normal positions, after the electric locking has been released for track section 10T, the route from 11 to 18 is selected via crossover 4. As a still further consideration, if the crossovers 2 and 4, for example, are both locked normal, the route from 11 to 18 is selected via crossover 5 if such route is available.

Assume, for example, that an operator designates an entrance point at 11 at a time when any route emanating from that point is available. Subsequent to such designation, the designation of an exit point at 18 causes the energization of relay 18XR by a circuit closed from (B+), including front contact 67 (see Fig. 1C) of relay 11L, polar contact 68 of relay 16NP in a right hand position, front contact 69 of relay 16NP, back contact 70 of relay 16CNR, back contact 71 of relay 14NP, back contact 72 of relay 16XR, wire 74, back contact 75 of relay 5R, front contact 111 of relay 5BY, back contact 112 of relay 6R, winding of relay 18XR, back contact 113 of relay 18NR, and contact 114 of button 18XB closed in a depressed position, to (CN). The picking up of that relay closes a stick circuit at front contact 115 to shunt contacts 113 and 114 out of the circuit just described.

When relay 18XR is picked up, a circuit is closed to cause the picking up of relay 6BN extending from (+), including front contact 116 of relay 18XR, back contact 117 of relay 6BY, and winding of relay 6BN, to (−). The picking up of that relay closes a circuit for relay 5BN (selected in accordance with the energized condition of relay 5BY) extending from (+), including front contact 116 of relay 18XR, back contact 117 of relay 6BY, front contact 118 of relay 6BN, back contact 119 of relay 6BY, front contact 120 of relay 5BY, and upper winding of relay 5BN, to (−). After relay 5BN is picked up, a circuit is closed to cause the picking up of relay 16XP extending from (+), including front contact 116 of relay 18XR, back contact 117 of relay 6BY, front contact 118 of relay 6BN, back contact 119 of relay 6BY, front contact 120 of relay 5BY, front contact 121 of relay 5BN, front contact 122 of relay 5BY, wire 123, winding of relay 16XP, and back contact 124 of relay 16XR, to (−).

Relay 16NR is picked up upon the energization of relay 16XP by a circuit closed from (+), including front contact 125 of relay 11TR, contact 126 of button 16NB, front contact 127 of relay 16XP, front contact 128 of relay 16NP, winding of relay 16NR, and back contact 129 of relay 14NR, to (−). The picking up of that relay closes a stick circuit at front contact 130 to shunt contacts 127 and 128 out of the circuit just described. Relay 14XR is picked up subsequent to the picking up of relay 16NR upon the energization of a circuit closed from (B+), including front contact 33 (see Fig. 1A) of relay 11NR, back contact 34 of relay 11XR, back contact 38 of relay 2AN, back contact 39 of relay 2BN, back contact 40 of relay 2BY, wire 41, back contact 42 of relay 4R, front contact 51 of relay 4BY, wire 52, winding of relay 14XR, back contact 131 of relay 14NP, back contact 132 of relay 14NR, back contact 133 of relay 16XR, front contact 134 of relay 16NP, front contact 135 of relay 16XP, and front contact 136 of relay 16NR, to (CN). The picking up of that relay closes a stick circuit at front contact 137 to maintain such relay energized, dependent for restoration upon the restoration of the relay 11NR for the entrance end of the route being established.

The picking of relay 14XR causes the picking up of relay 4BN by the energization of a circuit selected by relay 4BY extending from (+), including front contact 138 of relay 14XR, wire 139, front contact 140 of relay 4BY, and upper winding of relay 4BN, to (−). When relay 4BN is picked up, a circuit is closed to cause the picking up of relay 2R extending from (+), including front contact 138 of relay 14XR, wire 139, front contact 140 of relay 4BY, front contact 141 of relay 4BN, front contact 142 of relay 4BY, wire 143, back contact 144 of relay 2BY, back contact 145 of relay 2BN, and upper winding of relay 2R, to (−). The picking up of relay 2R completes the selection of the positions for the track switches of the crossovers to establish a route extending from 11 to 18 via crossover 2.

If in the establishment of that route the track switches of crossover 2 cannot be operated to their reverse positions because, for example, of the energized condition of the relay 2BN, the circuit described for relay 2BY cannot be closed responsive to entrance designation, and thus the relay 4R would be picked up under such conditions responsive to exit designation and the picking up of such relay would cause the successive energization of the relays 3N and 2AN to complete the establishment of the route via crossover 4.

For the purpose of illustrating how call-on signals are controlled, call-on signals are provided for east bound traffic on the lower of the two parallel tracks. It is to be understood that the principles by which such call-on signals are provided can as well be applied to the use of call-on signals for the other tracks of this embodiment of the present invention, or for any similar condition encountered in practice, only two call-on signals being shown in this disclosure for the purpose of simplifying as much as possible the disclosure of the present invention.

Inasmuch as a call-on signal provides a means by which a train may enter an occupied block, it is considered that an operator must use good judgment in the establishment of routes governed by call-on signals, so it has therefore been provided that in order to cause the clearing of a call-on signal an operator must distinctively designate the corresponding entrance point by the rotation of the entrance button NB provided for that point. It is further provided as is desirable in railway practice, that the designation of an entrance point for a route to be governed by a call-on signal cannot cooperate with the designation of an exit point for another interlocked group to establish a through route. Thus, if an operator designates an entrance point for a route to be governed by a call-on signal, in order to cause the establishment of a route emanating from that entrance point, he must designate an exit point for an available route within that interlocked group. Such mode of operation is provided by the use of a polar through route relay NP for each of the intermediate signal locations that could be included in a through route having an entrance point at a signal location where there is a call-on signal. Thus, the relay 16NP is a polar relay to provide that such relay when energized responsive to entrance designation will cause the energization of the initiating network for the right hand interlocked group for east bound traffic only provided such relay has been energized with a polarity characteristic of entrance designation for the clearing of a signal other than a call-on signal.

To consider specifically how such mode of operation is provided, assume an operator to desire to cause the establishment of a route governed by a call-on signal having an entrance point at 12. The rotation of the button 12NB in a counter clockwise direction for designation of the entrance end of that route causes the picking up of the call-on entrance relay 12CNR by the energization of a circuit closed from (+), including rotary contact 195 of button 12NB in a counterclockwise rotated position, back contact 196 of relay 12NR, and winding of relay 12CNR, to (—). The picking up of relay 12CNR applies (B—) energy at front contact 197 to the initiating network for east bound traffic. Such energy closes a circuit to cause the picking up of relays 2BY and 4BY, and the subsequent energization of the relay 16NP with a polarity to cause its polar contact 68 (see Fig. 1C) to be operated to a left hand position, and therefore prevent the application of energy to the initiating network for east bound traffic for the righthand interlocked group.

If a route is set up for the opposite direction of traffic, a similar mode of operation to that which has been described applies, there being no call-on signals provided in this embodiment for westbound traffic. In the setting up of a route, for example, extending from 18 to 11 via crossover 2, the designation of an entrance point at 18 causes the picking up of the entrance relay 18NR (see Fig. 1E) and the energization of that relay causes the picking up of the relay 6BY for the lower end of crossover 6 by the energization of a circuit extending from (+), including front contact 146 of relay 18NR, back contact 147 of relay 18XR, back contact 148 of relay 6R, and winding of relay 6BY, to (—). When that relay is picked up, a circuit is closed to cause the picking up of the entrance repeater relay 14NP extending from (+), including front contact 146 of relay 18NR, back contact 147 of relay 18XR, back contact 148 of relay 6R, front contact 149 of relay 6BY, back contact 150 of relay 5R, wire 151, back contact 152 of relay 16XR, front contact 153 of relay 11L, back contact 154 of relay 14NR, back contact 155 of relay 14XP, and winding of relay 14NP, to (—). The picking up of that relay closes a stick circuit at front contact 156 to shunt contacts 154 and 155 out of the circuit just described.

Upon the picking up of relay 14NP, a circuit is closed to condition the exit relays 10XR, 11XR and 12XR for energization so that the designation of either of those exit points can be effective for causing the establishment of a route. Assuming an operator to depress the button 11XB for designation of an exit point at 11, the relay 11XR is picked up by the energization of a circuit closed from (+), including front contact 157 (see Fig. 1D) of relay 10L, front contact 158 of relay 14NP, back contact 159 of relay 16NP, back contact 160 of relay 14XR, wire 162, back contact 163 of relay 4R, back contact 164 of relay 2BN, back contact 165 of relay 2AN, back contact 166 of relay 2AY, winding of relay 11XR, back contact 167 of relay 11NR, and contact 168 of button 11XB closed in a depressed position, to (—). The picking up of that relay closes a stick circuit at front contact 169 to shunt contacts 167 and 168 out of the circuit just described.

When relay 11XR is picked up, energy is applied to a feed point at the left hand end of the completion circuit network for the energization of the switch position selecting relays for the left hand interlocked group to cause the energization of relay 2R by a circuit closed from (+), including front contact 170 of relay 11XR, back contact 171 of relay 2AY, back contact 172 of relay 2AN, and upper winding of relay 2R, to (—). After that relay has picked up, energy is applied to a circuit for the picking up of relay 4BN extending from (+), including front contact 170 of relay 11XR, back contact 171 of relay 2AY, back contact 172 of relay 2AN, front contact 173 of relay 2R, wire 174, back contact 140 of relay 4BY, and upper winding of relay 4BN, to (—). When that relay is picked up, a circuit is closed to cause the picking up of relay 14XP (because the positions required for the track switches in the left hand interlocked group have been completely selected) extending from (+), including front contact 170 of relay 11XR, back contact 171 of relay 2AY, back contact 172 of relay 2AN, front contact 173 of relay 2R, wire 174, back contact 140 of relay 4BY, front contact 141 of relay 2BN, back contact 142 of relay 4BY, wire 175, winding of relay 14XP, and back contact 176 of relay 14XR, to (—). Relay 14NR is picked up dependent upon the energization of relay 14XP by a circuit extending from (+), including front contact 177 of relay 10TR, contact 178 of button 14NB, front contact 179 of relay 14XP, front contact 180 of relay 14NP, winding of relay 14NR, back contact 181 of relay 16CNR, and back contact 182 of relay 16NR, to (—). The picking up of that relay closes a stick circuit at front contact 183 to shunt contacts 179 and 180 out of the circuit just described.

Relay 16XR is energized when relay 14NR is picked up by a circuit extending from (+), including front contact 146 of relay 18NR, back contact 147 of relay 18XR, back contact 148 of relay 6R, front contact 149 of relay 6BY, back contact 150 of relay 5R, wire 151, winding of relay 16XR, back contact 184 of relay 16NP, back contact 185 of relay 16NR, back contact 186 of relay 16CNR, back contact 187 of relay 14XR, front contact 188 of relay 14NP, front contact 189 of relay 14XP, and front contact 190 of relay 14NR, to (—). The picking up of relay 16XR closes a stick circuit at front contact 191 to maintain such relay energized, dependent for deenergization upon the dropping away of the entrance relay 18NR for the entrance end of the route being established.

The picking up of relay 16XR causes the picking up of relay 5BN by the energization of a circuit closed from (+), including front contact 192 of relay 16XR, wire 193, back contact 120 of relay 5BY, and upper winding of relay 5BN, to (—). When that relay is picked up, a circuit is closed to cause the picking up of relay 6BN extending from (+), including front contact 192 of relay 16XR, wire 193, back contact 120 of relay 5BY, front contact 121 of relay 5BN, back contact 122 of relay 5BY, front contact 117 of relay 6BY, and upper winding of relay 6BN, to (—). The picking up of that relay completes the selection of the positions of the track switches required for the crossovers of the route extending through that interlocked group, and also for the entire through route extending from 18 to 11.

*Switch control.*—Each of the single track switches and the track switches of each of the crossovers can be power operated in accordance with the designation of the respective entrance and exit ends of a route including such track switches, or such track switches can be power operated by auxiliary control upon the actuation of the auxiliary switch control lever provided therefor. Inasmuch as the circuit organization for the power operation of each of the switch machines for the various crossovers and single track switches is similar in accordance with the energization of a switch position selecting relay for such track switch, the switch control circuits have been shown in detail for the power operation of the track switches of crossover 2 as typical of the circuits provided for the power operation of the track switches of each of the other crossovers and of the single track switch.

With reference to Fig. 2, it is provided that the relay 2WZ for the crossover 2 is energized upon the energization of a switch position selecting relay 2AN, 2BN or 2R for such crossover, if the electric locking allows such energization and if the track switches of the crossover are out of correspondence with the position selected by the energization of such switch position selecting relay. After the track switches have completed their operation in accordance with the positions called for by the switch position selecting relay energized, the relay 2WZ is dropped away, and the dropping away of that relay provides for the energization of a correspondence relay 2NCR or 2RCR, dependent upon the position of the track switches of the crossover, which relay in turn closes a portion of the circuit network for the energization of the signal control relays.

The switch position selecting relays 2AN, 2BN and 2R, in addition to being subject to energization in accordance with the entrance and exit designation of a route extending over the crossover 2, are also energized for the auxiliary control of the track switches of crossover 2 in accordance with the positioning of the auxiliary switch control lever 2SML, the actuation of such lever to a lower operating position causing the energization of the relays 2AN and 2BN for operating the track switches of crossover 2 to normal positions, and the actuation of such lever to an upper operating position being effective for causing the energization of relay 2R, and the subsequent power operation of the track switches of crossover 2 to reverse positions.

As a typical operating condition, assume, for example, an operator to cause the establishment of a route extending over the crossover 2 with its track switches in reverse positions as has been described in the setting up of a through route extending from 11 to 18. The picking up of relay 2R in the establishment of that route closes a circuit to cause the energization of relay 2WZ (if the track switches of crossover 2 are in their normal positions at that time) extending from (+), including back contact 200 of relay 2AN, back contact 201 of relay 2BN, front contact 202 of relay 2R, polar contact 203 of relay 2WP in a right hand position, front contact 204 of relay 9L, front contact 205 of relay 3L, and lower winding of relay 2WZ, to (—). The picking up of that relay due to such energization applies energy to the control circuit for the switch machines 2ASM and 2BSM upon the closing of front contacts 206 and 207 in an obvious manner, the polarity of such circuit being selected by the polar contacts of relay 2WZ operated to their left hand positions.

After the track switches of crossover 2 have been locked in their reverse positions in accordance with the positions called for by the energized condition of relay 2R, the relay 2WP is picked up with its polar contacts operated to a left hand position, and the relay 2WZ is dropped away by the opening of the circuit described for that relay at polar contact 203. The dropping away of relay 2WZ closes a circuit to cause the picking up of relay 2RCR extending from (+), including back contact 200 of relay 2AN, back contact 201 of relay 2BN, front contact 202 of relay 2R, polar contact 203 of relay 2WP in a left hand position, front contact 208 of relay 2WP, back contact 209 of relay 2WZ, and winding of relay 2RCR, to (—). The picking up of that relay closes a portion of the circuit network provided for the signal control relays as illustrated in Fig. 3, and as hereinafter described more in detail.

If the normal positions of the track switches of crossover 2 are called for by the route establishing means, as, for example, by the energization of relay 2AN, in a route established, the relay 2WZ is picked up (if the track switches of crossover 2 are not already in their normal locked positions) by the energization of a circuit closed from (+), including front contact 200 of relay 2AN, polar contact 210 of relay 2WP in a left hand position, front contact 211 of relay 9L, front contact 212 of relay 3L, and upper winding of relay 2WZ, to (—). The picking up of relay 2WZ due to such energization closes a circuit at front contacts 206 and 207 for the power operation of the switch machines 2ASM and 2BSM to normal positions in accordance with the polarity applied by the polar contacts of relay 2WZ in right hand positions.

After the track switches of crossover 2 are operated to their normal locked positions in accordance with the normal positions called for in the establishment of a route, the relay 2WZ is dropped away upon the picking up of relay 2WP with its polar contacts operated to left hand positions, and the dropping away of that relay closes a circuit to cause the picking up of relay 2NCR extending from (+), including front contact 200 of relay 2AN, polar contact 210 of relay 2WP in a right hand position, front contact 213 of relay 2WP, back contact 214 of relay 2WZ, and winding of relay 2NCR, to (—). The picking up of such relay closes a portion of the signal control circuits as illustrated in Fig. 3 and as hereinafter described.

The back contacts 215 and 216 of relay 2WP connected in multiple with contacts 210 and 203 respectively in the control circuits for the relay 2WZ are used in circuits providing for the reversal in mid-stroke of the track switches of crossover 2, such reversal in mid-stroke being made possible by the respective normal and reverse control windings of relay 2WZ being so connected as to provide opposing flux in the magnetic structure of the relay and thus cause the dropping away of such relay if both windings are contemporaneously energized. It is also provided by energy applied at front contact 217 that the relay 2WZ will be maintained energized to cause the operation of the switch machines 2ASM and 2BSM when such operation has been initiated, irrespective of the restoration of the switch position selecting relay energized to cause such operation. An electrical bias is provided on the switch machines 2ASM and 2BSM so as to operate its track switches back to the positions last called for in case they should become unlocked due to vibration or other causes. Under such conditions, the control circuit for the relay 2WZ to cause the operation of such switch machines back to their locked positions is energized in accordance with the circuit portion including back contacts 200, 201 and 202 of relays 2AN, 2BN and 2R when back contact 218 of relay 2WP is closed.

If an operator desires to cause the power operation of the track switches of crossover 2 to normal positions by auxiliary control, he actuates the lever 2MSL to a lower position, and such actuation causes the picking up of relay 2AN by the energization of a circuit closed from (+), including contact 219 of lever 2SML in a lower position, back contact 220 of relay 2R, and lower winding of relay 2AN, to (—). At the same time the relay 2BN is picked up by the energization of a circuit closed from (+), including contact 221 of lever 2SML in the lower position, back contact 222 of relay 2R, and lower winding of relay 2BN, to (—). The closing of front contact 200 of relay 2AN of course causes the operation of the track switches of crossover 2 in a manner which has been described.

If an operator desires to cause the operation of the track switches of crossover 2 to reverse positions by auxiliary control, he actuates the lever 2SML to an upper reverse operating position, and the relay 2R is picked up due to such actuation, if the relays 2AN and 2BN are dropped away at that time, by a circuit closed from (+), including contact 219 of lever 2SML in an upper position, back contact 223 of relay 2AN, back contact 224 of relay 2BN, and lower winding of relay 2R, to (—). The picking up of such relay causes the power operation of the track switches of crossover 2 to reverse positions in a manner which has been described.

*Signal controls.*—After the track switches of each of the crossovers, and each of the single track switches have been operated to their required positions for a route having its entrance and exit ends designated, a relay G is picked up for the signal governing entrance to such route, if such route is unoccupied by a train, and the picking up of that relay causes the display of a yellow or a green indication for such signal, in accordance with whether the next signal in advance is at stop or displays a proceed indication.

With reference to Fig. 3, the circuits have been illustrated for the control of the signals for the left hand interlocked group of the track layout illustrated in Fig. 4A, and such circuits are to be considered as typical of the manner in which the circuit selections are provided for the control of the signals employed for governing traffic through the right hand interlocked group illustrated in Fig. 4A.

As a typical operating condition, assume that an operator has caused the establishment of a route on the upper of the two main tracks for east bound traffic in a manner which has been described. After the track switches of crossovers 2 and 4, and the track switch 3 have been operated to their normal positions in accordance with the route selected, the correspondence relays NCR for such respective crossovers and single track switch are energized, and the energization of those relays closes a circuit to cause the picking up of the relay 11G for signal 11. The relay 11G is picked up by the energization of a circuit closed from (+), including front contact 225 of relay 13XR, back contact 226 of relay 4RCR, front contact 227 of relay 4NCR, front contact 228 of relay 4TR, back contact 229 of relay 3RCR, front contact 230 of relay 3NCR, back contact 231 of relay 2RCR, front contact 232 of relay 2NCR, front contact 233 of relay 3TR, back contact 234 of relay 11XR, front contact 235 of relay 11NR, and winding of relay 11G, to (—).

The relay 11G when picked up closes a circuit to cause the energization of the signal mechanism of signal 11 (see Fig. 4B) for the display of a yellow proceed-with-caution indication, if the next signal in advance of the route established is at stop, by the energization of a circuit closed from (+), including back contact 236 of signal clear repeater relay 15GYP (provided for signal 15), front contact 237 of relay 4NCR, back contact 238 of relay 3RCR, front contact 239 of relay 2NCR, front contact 240 of relay 11G, winding of signal 11, front contact 241 of relay 11G, front contact 242 of relay 2NCR, back contact 243 of relay 3RCR, front contact 244 of relay 4NCR, and back contact 245 of relay 15GYP, to (—). If the signal 15 displays a yellow or a green indication at the time when the signal control circuit is closed for signal 11, the signal clear repeater relay 15GYP is picked up by the energization of a circuit corresponding to an obvious circuit for relay 11GYP illustrated in Fig. 4B. With reference to Fig. 3, the energization of relay 15GYP of course causes energy to be applied to the circuit just described for signal 11 of an opposite polarity to cause the mechanism of such signal to be operated to a position to cause the display of a green clear signal indication. It is of course obvious that the track sections included in the route must be unoccupied in order that signal 11 may provide either a yellow or a green indication, because the circuit network for the energization of the G relays includes contacts of track relays.

Inasmuch as a call-on signal is used primarily to provide a signal for the passage of a train into an occupied block, the signal control relays G provided for the call-on signals cannot have track contacts included in their control circuits, and therefore must be energized by circuits other than those provided for energization of the signal control relays G for the high speed signals. For example, the relay 12CG provided for governing the call-on signal 12C has a separate energizing circuit from the circuit network including the track contacts, and therefore such relay is picked up when a route is established to be governed by the call-on signal 12C upon the energization of a circuit closed from (+), including front contact 317 of relay 14XR, back contact 318 of relay 4RCR, front contact 319 of relay 4NCR, back contact 320 of relay 2RCR, front contact 321 of relay 2NCR, back contact 322 of relay 12XR, front contact 323 of relay 12CNR, and winding of relay 12CG, to (—). The picking up of that relay applies energy directly to the searchlight signal 12c upon the closing of front contacts 324 and 325 to cause such signal to display a yellow call-on indication.

It is believed from the typical signal control conditions that have been described, that it will be readily understood by those familiar with the art how similar signal control means is provided for each of the signals in each of the interlocked groups, and how signal controls can be provided for practically any track layout encountered in practice.

*Electric locking.*—Although various forms of electric locking can be used with the system provided by the present invention, the electric locking illustrated in Fig. 5 has been used for this embodiment as it is believed to be practically universally applicable, as is the remainder of the system provided by the present invention, to any complex switch and signal control problem encountered in practice. Such electric locking involves the use of normally energized east and west stick route locking relays ES and WS for the various track sections for providing rear release route locking in a manner fully described in the above mentioned patent to A. Langdon, Patent No. 2,148,865, dated February 28, 1939. The route locking provides for the deenergization of an ES or WS relay, dependent upon the direction of traffic established, for each track section included in each route set up, such energization being effective upon or prior to the clearing of the signal governing entrance to that route. The route locking relays remain deenergized for the track sections included in a route in advance of a train, and are again respectively energized after passage of the train through the respective track sections for which they are provided. The approach or time locking for the various signals is provided in accordance with usual practice for the purpose of delaying the restoration of the route locking for a predetermined time under certain conditions.

As a typical example of how the route locking is effective when a route is set up, assume that a route has been set up in a manner described extending from 11 to 16 via crossover 2, and the setting up of such route has caused the energization of the signal control relay 11G for signal 11 governing entrance to such route. The picking up of relay 11G causes the dropping away of the route locking relay 3ES by opening its circuit at back contact 250, such circuit extending from (+), including normally closed contact 251 of thermal relay 11TH, back contact 250 of relay 11G, front contact 252 of relay 11AS, front contact 253 of relay 3ES, and winding of relay 3ES, to (—). When relay 3ES is dropped away, the relay 9ES has its normally energized circuit opened at front contact 254 to cause such relay to be dropped away because the relay 2NCR is dropped away at that time. Relay 9ES is normally energized by a circuit extending from (+), including contact 255 of thermal relay 12TH, back contact 256 of relay 12CG, back contact 257 of relay 12AG, front contact 258 of relay 12AS, front contact 254 of relay 3ES, front contact 259 of relay 9ES, and winding of relay 9ES, to (—). The dropping away of relay 9ES opens a normally energized circuit at front contact 260 for relay 10ES, such normally energized circuit extending from (+), including front contact 260 of relay 9ES, front contact 261 of relay 4ES connected in multiple with front contact 262 of relay 4NCR, front contact 263 of relay 10ES, and winding of relay 10ES, to (—).

Upon the clearing of signal 11 governing entrance to the route extending from 11 to 16 via crossover 2, the signal repeater relay 11RGP for that signal is dropped away (see Fig. 4B), and the dropping away of such relay opens the circuit by which relay 11AS (see Fig. 5) is normally maintained energized extending from (+), including front contact 264 of relay 11RGP, winding of thermal relay 11TH, front contact 265 of relay 11AS, and winding of relay 11AS, to (—). The inclusion of the windings of relays 11AS and 11TH in series in that circuit of course limits the current flow to prevent the operation of the thermal relay 11TH.

In accordance with the dropping away respectively of the route locking relays 3ES, 9ES and 10ES, the lock relays 3L, 9L and 10L are dropped away because of the opening of obvious circuits for those relays at front contacts 266, 267 and 268 respectively. The dropping away of the lock relay L for each of the track sections guard against the possible operation of each of the track switches in such track section from its locked position by opening the control circuits for such track switch as illustrated, for example, in Fig. 2 for the track switches of the crossover 2. The dropped away position of the relay 3L opens the normal and reverse control circuits for the relay 2WZ at front contacts 212 and 205 respectively, and in a similar manner the dropping away of relay 9L also opens the normal and reverse control circuits for relay 2WZ at front contacts 211 and 204 respectively.

For purposes of the prevention of the preconditioning of routes as hereinafter more fully considered, the dropping away of a lock relay for a track switch closes a stick circuit for the switch position selecting relay energized for the establishment of the route over such track switch. Thus, under the assumed conditions, the relay 2R is picked up, and the dropping away of relay 3L when the route locking becomes effective closes a stick circuit for that relay extending from (+), including back contact 269 of relay 3L, front contact 270 of relay 2R, front contact 222 of relay 2R, and lower winding of relay 2R, to (—).

The dropping away of relay 9L also closes a stick circuit for relay 2R extending from (+), including back contact 271 of relay 9L, front contact 272 of relay 2R, front contact 222 of relay 2R, and lower winding of relay 2R, to (—). It will be seen from such circuits, that the relay 2R is maintained energized by one or the other of its stick circuits when either of the lock relays 3L or 9L is dropped away. In an obviously similar manner, the relays 2AN and 2BN are maintained picked up by stick circuits when the route locking is effective for the track sections including the track switches with which such relays are associated in their normal positions.

*Restoration to normal.*—The restoration of the parts of the system associated with the setting up of a route to normal can be effected manually, or by automatic control dependent upon passage of a train; except for routes governed by call-on signals which can be restored only upon manual designation of such restoration by an operator.

To consider a typical example of how restoration can be effected by manual designation, with reference to Fig. 1A, assume that an operator desires to cause restoration of a route which has been set up extending from signal 11 to signal 16 via crossover 2. To designate such restoration he pulls out the button 11NB, and the pulling out of that button causes the dropping away of relay 11NR by opening the stick circuit for that relay at contact 31. When relay 11NR is dropped away, the signal 11 is restored to stop because of the opening of the circuit for relay 11G (see Fig. 3) at front contact 235, the dropping away of relay 11G being effective to deenergize and shunt the winding of the search light signal 11 and thus cause such signal to be restored to its normal stop indication position. The restoration of such signal to stop causes the energization of the signal repeater relay 11RGP (see Fig. 4B) in accordance with the energization of a circuit closed from (+), including normally closed contact 246 of signal 11, normally closed contact 247 of signal 11, and winding of relay 11RGP, to (—). The picking up of that relay closes a circuit to cause the picking up of relay 11AS (see Fig. 5) extending from (+), including front contact 264 of relay 11RGP, front contact 273 of relay 2TR, and winding of relay 11AS, to (—). If there is a train on the approach track section 2T, the relay 11AS is picked up only after the thermal relay 11TH has completed its operation to its operated position, such relay having its winding energized in accordance with the closed condition of back contact 265.

When the relay 11AS is picked up, a circuit is closed at front contact 252 to cause the picking up of relay 3ES (provided the thermal element of relay 11TH has cooled if such thermal relay has been operated) extending from (+), including normally closed contact 251 of relay 11TH, back contact 250 of relay 11G, front contact 252 of relay 11AS, front contact 274 of relay 3TR, and winding of relay 3ES, to (—). Upon the picking up of relay 3ES a circuit is closed at front contact 254 to cause the picking up of relay 9ES, and the picking up of that relay closes a circuit at front contact 260 to cause the picking up of relay 10ES. The energization of such ES relays causes the energization of the relays 3L, 9L and 10L upon the closing of front contacts 266, 267 and 268 respectively, and the picking up of such relays opens the stick circuits for the switch position selecting relays for the track switches included in the route being restored. That is, for example, the picking up of the relays 3L and 9L (see Fig. 2) opens the stick circuits provided for the relay 2R for the track switches of crossover 2 at back contacts 269 and 271 respectively.

With reference to Figs. 1A and 1B, when the entrance 11NR is dropped away upon designation by an operator for restoration of the route emanating from that point, the opening of front contact 33 opens the circuits for relays 4BY and 14XR to cause such relays to be dropped away. Upon the dropping away of relay 14XR the pick-up circuits for relays 4BN and 2R are opened at front contact 138 (see Fig. 1C). The relays 2R and 4BN are therefore dropped away as soon as their stick circuits are opened in a manner which has been described. Upon the dropping away of such relays, the correspondence relays 2RCR and 4NCR are dropped away, thus completing the restoration of the parts of the system associated with the route under consideration. The relay 2RCR is dropped away because of the opening of front contact 282 of the circuit described for such relay (see Fig. 2).

The restoration to normal of the parts of the system effected automatically upon passage of a train is effective in a much similar manner, the entrance relay NR for the entrance end of such route being dropped away because of the passage of a train past that entrance point. As a typical example, assume a route to be established from 11 to 14 via crossover 2 and assume passage of a train past the signal 11 governing entrance to such route. The dropping away of the track relay 3TR causes the dropping away of relay 11NR by opening the stick circuit for that relay at front contact 30, and the dropping away of relay 11NR causes the restoration to stop of the signal and the energization of the signal repeater relay 11RGP in a manner which has been described. The picking up of relay 11RGP causes the energization of relay 11AS (see Fig. 5) by the closing of a circuit extending from (+), including front contact 264 of relay 11RGP, back contact 275 of relay 3TR, and winding of relay 11AS, to (—). The picking up of such relay causes the restoration of the relay 3ES, only after the train has passed through the track section 3T, and, although the picking up of that relay at that time opens a stick circuit for relay 2R at back contact 269 (see Fig. 2), the relay 2R is still maintained energized by the stick circuit closed at back contact 271 of relay 9L.

When the train leaves track section 9T, the relay 9ES is picked up, and the relay 2R is dropped away because the track switches of crossover 2 are no longer locked in their reverse positions. The relay 4BN is, however, maintained energized in accordance with the deenergized condition of relay 10ES, until the train has left track section 10T.

The restoration of the relays 4BY and 14XR is effective dependent upon the dropping away of relay 11NR in a manner which has been described, and the opening of the pick-up circuits for relays 2R and 4BN by the dropping away of relay 14XR provides that such relays can be restored as soon as their stick circuits are opened upon passage of the train through the route.

It is believed to be readily apparent that a similar mode of operation is effective for the restoration of routes extending through the right hand interlocked group, such restoration being under all conditions dependent upon the entrance relay NR for the route in that interlocked group, irrespective of routes extending through adjacent interlocked groups. It will also be noted that, when restoration is effective for an intermediate signal, the exit repeater relay XP for that signal is deenergized only after the dropping away of the exit relay for the exit end within that interlocked group of the route being restored. Inasmuch as the pick-up circuit for each of the through route relays NP includes a back contact of the relay XP for that intermediate signal, it is provided that it must be proven that the exit relay XR is dropped away for a route emanating from an intermediate signal entrance point before a through route relay NP for that signal can be picked up. A reason for such mode of operation is to insure the proper restoration of a route under all conditions.

To illustrate the utility of the exit repeater relay XP to insure proper restoration, assume that for some reason a route has been set up from 15 to 17 when there is no train approaching signal 15 in the left hand interlocked group and there is no route set up in approach of that signal. Also, assume at that time that an operator designates an entrance point at 11 as for the establishment of a route to 14 or 18 on the lower track. If the operator causes restoration for the route from 15 to 17 before an exit point is designated for a route emanating from the designated entrance point at 11, it will be obvious that, were it not for back contact 49 of relay 15XP (see Fig. 1C) in the pick-up circuit for relay 15NP, such relay might be picked up upon the dropping away of relay 15NR before relay 17XR had been dropped away, and the picking up of such relay could provide energy for the stick circuit of relay 17XR to prevent its proper restoration. If restoration were prevented under such conditions it would be possible that an undesired through route might be established from 11 to 17. The circuit organization employing the relays XP as provided by this invention provides positive operation, irrespective of any difference there may be in the operating characteristics of the various relays.

*Prevention of preconditioning.*—An object of the stick circuits provided for the lower windings of switch position selecting relays N, AN, BN and R is to provide a circuit means in the initiating circuit networks for allowing the conditioning dependent upon entrance designation of only the exit relays that are for exit points of available routes extending from that entrance point. As an example of how such circuit means prevents the preconditioning of routes, assume a route to have been set up extending from 11 to 14 via crossover 2, and assume after such route is established that an operator designates an entrance point at 13 and subsequently designates an exit point at 11 to attempt to establish a route from 13 to 11 when the crossover 2 has its track switches locked in reverse positions. Energy cannot feed to the winding of relay 11XR to condition it for energization when the relay 2R is picked up, because of the conditioning circuit for relay 11XR being opened at back contact 276 (see Fig. 1A), and thus the relay 11XR cannot be picked up under such conditions, and cannot therefore condition a route so that it can be established when it becomes available. A reason for the prevention of such preconditioning is to prevent the potential calling for a position of a track switch contrary to that required for a route already established, because if such preconditioning were allowed, it might be possible that the loss of shunt under a train due to rusty rails or other conditions might under certain conditions cause the operation or partial operation of a track switch under a train.

It is equally important that it be provided that an operator is prevented from preconditioning the condition of a track switch by the actuation of the auxiliary switch control lever SML provided therefor. Such prevention of preconditioning is provided in the form of stick circuits provided as typically shown in Fig. 2 for the switch position selecting relays of the crossover 2, such stick circuits being provided in such a manner that the restoration of a switch position selecting relay is prevented if an operator actuates the auxiliary lever SML for such track switch to such a position as would call for the operation of that track switch to its opposite position.

As a typical example of how the stick circuits are provided to prevent the preconditioning of a route by the actuation of an auxiliary switch control lever SML, assume with reference to Fig. 2, that the relay 2R is picked up in an established route at a time when an operator attempts to cause the operation of the track switches of crossover 2 to their normal positions by the actuation of the lever 2SML to its lower normal operating position. The actuation of that lever to such position closes a stick circuit for relay 2R extending from (+), including contact 221 of lever 2SML in a lower position, front contact 222 of relay 2R, and lower winding of relay 2R, to (—). Such stick circuit provides that the relay 2R is maintained picked up, irrespective of its stick circuit dependent upon the route locking which could possibly be opened upon the loss of shunt of a train passing through the route, until the lever 2SML is restored to its normal position. The maintaining energized of relay 2R of course prevents the picking up of relays 2AN and 2BN by opening the circuits described for such relays at back contacts 220 and 222 respectively. In a similar manner, the actuation of the lever 2SML to its reverse operating position at a time when the track switches of crossover 2 are locked in their normal positions, provides for the energization of a stick circuit for the relay 2AN and/or the relay 2BN picked up in accordance with the route established, such stick circuits preventing the subsequent energization of the relay 2R until the auxiliary switch control lever 2SML has first been restored to its normal center position.

*Indications.*—The indications provided by the present invention are definite and complete so that an operator can be best informed of conditions which he must consider in the designation of the ends of routes to be established, and in the auxiliary control of the track switches. The system therefore provides for the indication of an established route by the illumination of translucent inserts in the control panel to provide an effectively continuous line of white light, such indication being displayed immediately upon the selection of a route by the switch position selecting relays, prior to the power operation of the track switches to establish such route. The passage of a train through a route which is set up is indicated by the illumination of the inserts by red lamps corresponding to the occupied track sections in such route, such lamps being extinguished when the train leaves their respective track sections, and a white lamp illuminated again for each of those inserts if that portion of the route remains established. In the case of a crossover where there is one translucent insert provided for each of its detector track sections, the passage of a train over such crossover from one of such track sections to the other provides for the extinguishing of the red lamp of the translucent insert for the track section which becomes unoccupied, and the illumination of a white lamp for that translucent insert to indicate that such end of the crossover is locked in a reverse position by the presence of the train in the detector track section for the opposite end of the crossover.

If a single track switch or a crossover is out of correspondence with the positions called for by the switch position selecting relays, the translucent insert included in the route selected for the indication of switch position is flashed to indicate that correspondence has not yet been established in accordance with the required position for the route to be set up. Such flashing of course continues only so long as the single track switch or crossover is out of correspondence with the position called for by the switch position selecting relays. It is also provided that the dropping away of a relay WP for a single track switch or a crossover because of such track switch becoming unlocked at any time, irrespective of whether or not there is a route established over such track switch, will cause the flashing of the translucent insert used for indicating switch position for such single track switch or crossover corresponding to the position to which such single track switch or crossover had last been operated.

The indication system provided by the present invention allows for the illumination of the translucent inserts for the track portions between the crossovers and single track switches and adjacent the route ends by the energization of white lamps for such inserts only responsive to the establishment of routes by entrance-exit designation. Such mode of operation therefore provides that the actuation of the respective auxiliary control levers SML for the various track switches effects the energization only of the lamps used for indicating the postions of such track switches. It is provided, however, that the translucent inserts for the track portions between the single track switches and crossovers and adjacent the route ends are illuminated by the energization of red lamps for such translucent inserts in case of a track circuit failure for the corresponding track sections, or in case of passage of a train when a route has not been established by the route establishing means, as can be effected, for example, by the positioning of the track switches by the auxiliary control means to establish a desired route, and by the passage of a train over such route by hand signal.

Figure 8:
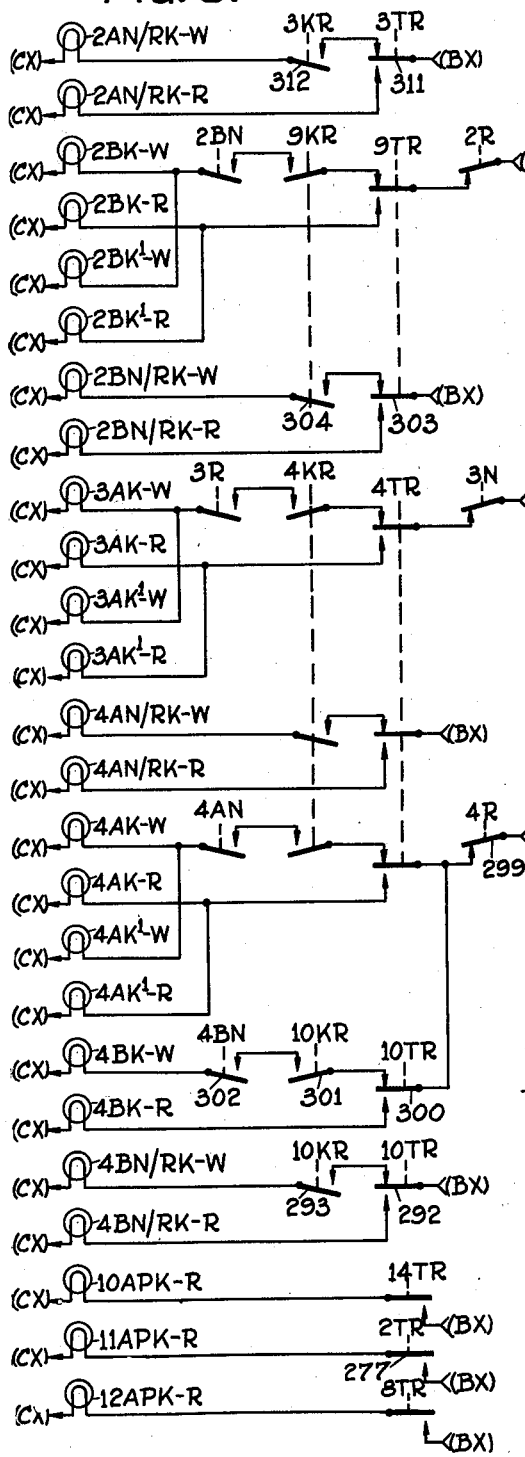
Fig. 8 illustrates the control circuits provided in this embodiment of the present invention for indicator lamps used in the illumination of translucent inserts between the track switches and adjacent the route ends along the track diagram illustrated in Fig. 1A.

For an understanding of the circuit organization provided for the energization of the indicator lamps to furnish the distinctive indications heretofore considered in a general manner, assume that a route is established through the track layout illustrated in Fig. 4A extending from 11 to 14 via crossover 2. With reference to the track diagram illustrated in Fig. 1A, the approach of a train to signal 11 is indicated when the train enters the approach track section by the illumination of the translucent insert 11APK in accordance with the energization of a red lamp 11APK—R, such red lamp (see Fig. 8) being energized by an obvious circuit closed at back contact 277 upon the dropping away of the track relay 2TR for the approach track section.

Figure 9:
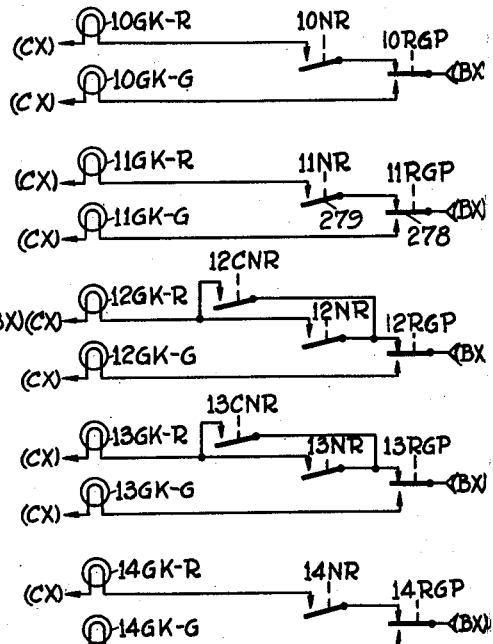
Fig. 9 illustrates the circuits provided for the control of signal indicator lamps included in the control buttons illustrated in Fig. 1A for their respective signal locations.

When an operator designates the entrance end of a route at signal 11 by depression of the entrance button 11NB, the entrance relay 11NR (see Fig. 1A) is picked up, and the picking up of such relay causes the illumination of a red lamp included in a lamp receptacle behind the button 11NB for the illumination of the arrow of such button. With reference to Fig. 9, the red lamp for button 11NB is illuminated by the energization of a circuit closed from BX, including front contact 278 of relay 11RGP, front contact 279 of relay 11NR, and lamp 11GK—R, to (CX).

Figure 6:
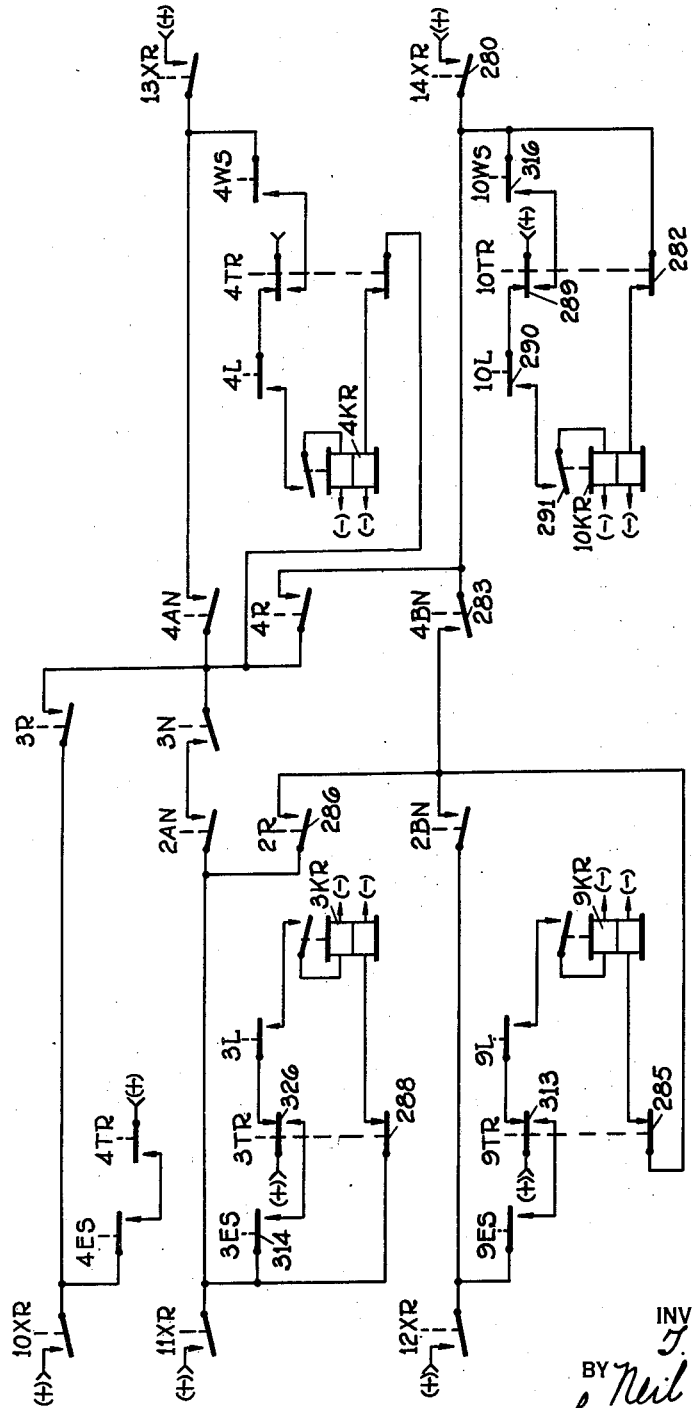
Fig. 6 illustrates circuits provided in this embodiment of the present invention for the energization of relays used in connection with the display of indications along the track diagram illustrated in Fig. 1A.

When the exit relay 14XR is picked up it causes the energization of the indication relay 10KR (see Fig. 6), because such relay is provided for the track section 10T included in the route to be established. Relay 10KR is picked up under such conditions due to the energization of a circuit extending from (+), including front contact 280 of relay 14XR, front contact 282 of relay 10TR, and lower winding of relay 10KR, to (−). After the relay 4BN is picked up in the establishment of the route under consideration, the relay 9KR for the track section 9T is picked up by the energization of a circuit closed from (+), including front contact 280 of relay 14XR, front contact 283 of relay 4BN, front contact 285 of relay 9TR, and lower winding of relay 9KR, to (−). The relay 3KR is also picked up for the track section 3T included in the route to be set up, after the picking up of the relay 2R in the establishment of that route, due to the energization of a circuit closed from (+), including front contact 280 of relay 14XR, front contact 283 of relay 4BN, front contact 286 of relay 2R, front contact 288 of relay 3TR, and lower winding of relay 3KR, to (−). Each of the relays KR when picked up is maintained energized dependent upon the effectiveness of the locking and the energized condition of the track relay for the track section for which such relay is provided. Thus, for example, the relay 10KR is maintained energized after the route is set up by a stick circuit closed from (+), including front contact 289 of relay 10TR, back contact 290 of relay 10L, front contact 291 of relay 10KR, and upper winding of relay 10KR, to (−). It will be noted that the relays KR are energized in a circuit network having circuit portions corresponding to the various routes and such network is energized at ends corresponding to the respective entrance and exit points, the relays KR being connected at points comparable to facing point positions of the track switches.

Figure 7:
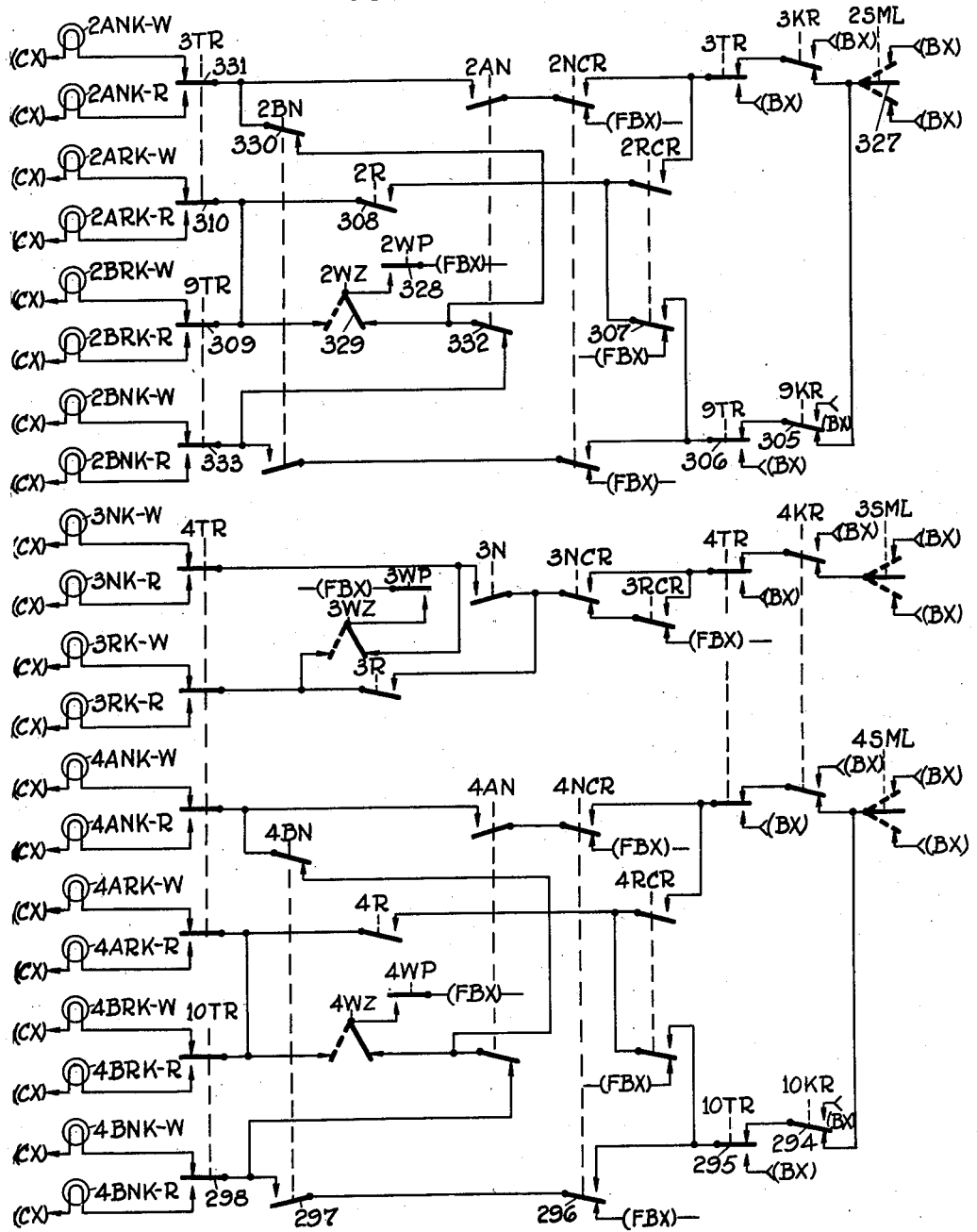
Fig. 7 illustrates the control circuits for the indicator lamps for providing certain indications relative to the establishment of routes over the track switches, such lamps being provided for the illumination of translucent inserts along the track diagram illustrated in Fig. 1A.

The picking up of the relays KR causes the energization of white indicator lamps for translucent inserts corresponding to the track sections in the selected route for which such KR relay is provided. Thus, the picking up of relay 10KR causes the energization of the white lamp 4BN/RK—W (see Fig. 8) of the light section 4BN/RK (see Fig. 1A) by the energization of a circuit closed from (BX), including front contact 292 of relay 10TR, front contact 293 of relay 10KR, and lamp 4BN/RK—W, to (CX). The picking up of relay 10KR also causes the illumination of the white lamp 4BNK—W (see Fig. 7) of light section 4BNK upon the closing of a circuit extending from (BX), including front contact 294 of relay 10KR, front contact 295 of relay 10TR, front contact 296 of relay 4NCR, front contact 297 of relay 4BN, front contact 298 of relay 10TR, and lamp 4BNK—W, to (CX). If the track switches of crossover 4 are not in their normal positions in accordance with the required positions for the establishment of that route, the relay 4NCR is of course deenergized, and such relay in its deenergized position applies energy intermittently to the circuit just described at back contact 299 to provide for the flashing of the lamp 4BNK—W until the track switches of crossover 4 have been operated to their normal locked positions in accordance with the required positions for the route being set up.

Figure 10:
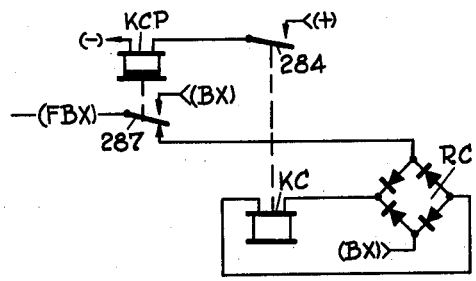
Fig. 10 illustrates an efficient means for supplying frequently interrupted energy for the flashing of certain of the indicator lamps under certain operating conditions.

Energy for the flashing of the indicator lamps can be provided, for example, by a continuously operated coder, by a flashing relay, or by a circuit organization as shown in Fig. 10 and fully disclosed in the prior application of Judge and Pierce, Ser. No. 307,650, filed December 5, 1939. In accordance with Fig. 10, it is provided that the relays used for providing the flashing energy are active only when flashing energy is required, it being provided that such relays are of the direct current type, but they supply flashing alternating current energy for the indicator lamps.

When a circuit is closed as has been described for the flashing of an indicator lamp a circuit is closed in an obvious manner through the rectifier RC for the energization of the relay KC. Because of the relatively high impedance of relay KC to the lamp or lamps connected in the circuit, such lamps are not illuminated except when relay KCP is picked up upon the closing of front contact 284 of relay KC. The indicator lamps having their circuits closed for flashing are of course illuminated when energized by alternating current upon the closing of front contact 287.

The relay 10KR when picked up under the described conditions also causes the illumination of the translucent insert 4BK by closing a circuit for lamps 4BK—W (see Fig. 8) extending from (BX), including back contact 299 of relay 4R, front contact 300 of relay 10TR, front contact 301 of relay 10KR, front contact 302 of relay 4BN, and lamp 4BK—W, to (CX).

The translucent insert 2BN/RK is illuminated dependent upon the energized condition of the relay 9KR which closes a circuit for the lamp 2BN/RK—W extending from (BX), including front contact 303 of relay 9TR, front contact 304 of relay 9KR, and lamp 2BN/RK—W, to (CX). The relay 9KR when energized also provides for the illumination of the translucent inserts 2ARK and 2BRK for the crossover 2 by providing for the energization of the white lamps of such inserts. The lamp 2BRK—W (see Fig. 7) is steadily energized (if the track switches of crossover 2 are already in their reverse positions) by a circuit closed from (BX), including front contact 305 of relay 9KR, front contact 306 of relay 9TR, front contact 307 of relay 2RCR, front contact 308 of relay 2R, front contact 309 of relay 9TR, and lamp 2BRK—W, to (CX). The closing of that circuit also causes the energization of the lamp 2ARK—W selected by front contact 310 of relay 3TR. If the track switches of crossover 2 are not already in their reverse positions, the deenergized condition of relay 2RCR applies flashing energy at back contact 307 to the lamps 2ARK—W and 2BRK—W. To complete the illumination of the translucent inserts corresponding to the route selected extending from 11 to 14 via crossover 2, the translucent insert 2AN/RK is illuminated in accordance with the energized condition of the relay 3KR which provides for the energization of the lamp 2AN/RK—W (see Fig. 8) for that insert by a circuit closed from (BX) including front contact 311 of relay 3TR, front contact 312 of relay 3KR, and lamp 2AN/RK—W, to (CX).

After the route has been completely set up, so that the track switches all having been operated to their called for positions, the translucent inserts corresponding to the route established are all steadily illuminated, and the clearing of the signal 11 governing entrance to the route causes the dropping away of the signal repeater relay 11RGP. The dropping away of that relay causes the extinguishing of the red signal indicator lamp of the entrance button 11NB upon the opening of front contact 278 (see Fig. 9) and the closing of back contact 278 closes an obvious circuit for the illumination of the green lamp 11GK—G included in the lamp receptacle behind that button. When a train accepts signal 11 to proceed through the route established from 11 to 14 via crossover 2, the dropping away of the track relay 3TR opens the stick circuit for the indication relay 3KR (see Fig. 6) at front contact 326, and opens the pick-up circuit for such relay at front contact 288 to cause such relay to be dropped away. The dropping away of relay 3TR opens the circuit which has been described for the white lamp of light section 2AN/RK at front contact 311, and closes an obvious circuit for the red lamp 2AN/RK—R for that light section. The light section 2ARK also has its white lamp extinguished and its red lamp illuminated due to the shifting of contact 310 of relay 3TR.

When the train enters track section 9T, the dropping away of relay 9TR opens the circuit which has been described for the white lamp of light section 2BRK at front contact 309, and closes a circuit in an obvious manner for the red lamp 2BRK—R for that light section. The relay 9KR is dropped away upon entrance of the train into the track section 9T because of the opening of front contacts 313 and 285 of relay 9TR (see Fig. 6). The relay 9TR in dropping away also causes the extinguishing of the white lamp and the illumination of the red lamp of light section 2BN/RK upon the shifting of contact 303 (see Fig. 8).

When the train enters the track section 10, the dropping away of relay 10TR causes the deenergization of the white lamps and the energization of the red lamps for the corresponding light sections 4BK and 4BN/RK (see Fig. 8) upon the shifting of contacts 300 and 292 respectively. The white lamp of light section 4BNK is extinguished and the red lamp illuminated upon the shifting of contact 293 of relay 10TR (see Fig. 7). The relay 10KR is dropped away upon entrance of the train into track section 10T by the opening of contacts 282 and 289 (see Fig. 6).

Before considering further the passage of a train through a route it is perhaps expedient to consider in a general manner a primary function of the relays KR, namely, to provide a means for preventing undesirable flashes of the lamps under certain conditions. Upon reviewing the mode of operation of the system when restoration is effective upon passage of a train, it will be observed that the picking up of a track relay for a detector track section in the rear of a train causes the restoration of the route locking which restores the lock relay L for that track section, and the picking up of that lock relay causes the dropping away of the switch position selecting relay for each of the track switches in that section. Inasmuch as the track relay is the first to shift its position under the conditions just considered, it will be obvious with reference to Fig. 7, for example, that the picking up of the track relay TR causes the extinguishing of a red lamp for a light section, and, were it not for the deenergized condition of relay KR for that track section, a white flash would be effected upon the picking up of that track relay before the switch position selecting relay N, AN, BN or R in the circuit had time to be dropped away. Such condition is aggravated in practice by the use of different types of relays having different operating characteristics for different functions of the system, thus rendering it impractical to preadjust the operating characteristics of the relays properly to avoid undesirable flashes of the indicator lamps.

By the use of a relay KR for each of the track sections it is provided that such relay is dropped away when a train enters its track section, and, if restoration is effective for the route in the rear of the train, such relay remains deenergized until another route is established, thus preventing a possible flash of white light when a track relay for that track section is picked up prior to the restoration of the switch position selecting relays for that track section.

As the train proceeds through the route from 11 to 14 via crossover 2 and leaves track section 3T, the red lamps for the light sections 2AN/RK and 2ARK are extinguished upon the shifting of the back contacts of relay 3TR associated therewith, and the shifting of contact 310 of relay 3TR closes a circuit which has been described for the white lamp 2ARK—W to cause the illumination of that lamp to indicate to the operator that the upper end of crossover 2 although not included in an occupied track section is locked in a reverse position because of the presence of the train in the detector track section associated with the other end of the crossover. The white lamp 2AN/RK—W, however, for light section 2AN/RK is not illuminated because the relay 3KR remains deenergized on account of its pick-up circuit being open (see Fig. 6) at back contact 314 of relay 3ES, and at front contact 280 of relay 14XR.

When the train proceeds further through the route so that the track relay 9TR is picked up, the picking up of that relay opens the circuit at contact 306 (see Fig. 7) for the lamps of light sections 2ARK and 2BRK to cause them to be extinguished. The relay 9KR is in a deenergized position at that time because such relay is dropped away when its circuit is opened upon the dropping away of relay 9TR. Relay 9KR remains dropped away when the train leaves track section 9T because its pick-up circuit is open at back contact 314 (see Fig. 6) of relay 3ES, and at front contact 280 of relay 14XR. The relay 10KR remains dropped away when the train leaves track section 10T because its pick-up circuit is open at back contact 314 of relay 3ES, at front contact 280 of relay 14XR. As the train leaves the route and the relay 10TR is picked up, the lamps for the light sections 4BNK and 4BN/RK are extinguished because of the picking up of the track relay 10TR to complete the extinguishing of the indicator lamps for the route under consideration.

Inasmuch as it is entirely probable that switching and back-up moves will be provided through the track layout, it is provided that proper indications are displayed under such conditions in order that an operator may be properly informed as to the locked condition of the route which remains established as the train reverses its direction of travel through the track layout. That is, for example, with reference to Fig. 4A, assume that a west bound train enters the route extending from 14 to 11 and occupies all three of the track sections included in such route when it is entirely past the entering signal 14. Then assume that the train reverses its direction and enters the right hand interlocked group after a route has been properly set up extending through such group for an east bound train movement. It will be noted, according to the type of route locking provided in this embodiment of the present invention, that a route locking relay WS has been dropped away for each of the track sections 3T, 9T and 10T prior to the entrance of a train into that route, and after entrance of the train restoration of such relays is dependent either upon the passage of the train through the route in a west bound direction or the passage of a train out of that route entirely in an east bound direction. In other words, the restoration of the route locking relays WS for the track sections 3T and 9T is dependent upon the restoration of the route locking relay WS for the track section 10T, therefore when the train reverses its direction of travel, the route extending from 14 to 11 remains established and locked, except for the restoration of the signal 14 and the respective entrance and exit relays for that route, until the train has left the entire route as it proceeds in an east bound direction.

To consider how the indications are provided to conform to such locked condition of the route, assume the train to reverse its direction and leave the track section 3T. As the train proceeds in an easterly direction, the picking up of the relay 3TR for the track section 3T in the rear of the train closes a circuit to cause the picking up of the relay 3KR (see Fig. 6), such circuit extending from (+), including back contact 289 of relay 10TR, back contact 316 of relay 10WS (because the route locking for west bound traffic is still effective under the assumed conditions), front contact 283 of relay 4BN, front contact 286 of relay 2R, front contact 288 of relay 3TR, and lower winding of relay 3KR, to (—). The picking up of relay 3TR of course causes the extinguishing of the red lamps for the light sections corresponding to that track section, and the picking up of the indication relay 3KR for that track section provides that the white indicator lamps for the corresponding light sections are illuminated by the energization of circuits which have been described. Such white lamps are illuminated because that portion of the route still remains locked in accordance with the effectiveness of the route locking previously effected for west bound traffic which has not yet been restored, and which cannot be restored until a train in passing in an easterly direction has passed the intermediate signal location.

When the train in proceeding in an east bound direction leaves the track section 9T, the picking up of relay 9TR closes a circuit to cause the picking up of the indication relay 9KR (see Fig. 6) extending from (+), including back contact 289 of relay 10TR, back contact 316 of relay 10WS, front contact 283 of relay 4BN, front contact 285 of relay 9TR, and lower winding of relay 9KR, to (—). The picking up of relay 9TR of course causes the extinguishing of the red lamps for the light sections for that track section, and the picking up of that relay together with the energized condition of relay 9KR causes the illumination of the white lamps for those light sections by the energization of circuits which have been described.

When the east bound train leaves the track section 10T, the picking up of relay 10TR opens the circuits which have been described for relays 3KR and 9KR at back contact 289 and as soon as the stick circuits for those relays are opened upon the restoration of the route locking, such relays are dropped away, and the indicator lamps for the portions of the route with which such relays are associated are deenergized. The relay 10KR has no opportunity to be energized under such conditions, so therefore the picking up of relay 10TR causes the extinguishing of the red lamps for the light sections corresponding to track section 10T, and the white lamps for such light sections remain unilluminated.

It will be noted from the circuits which have been described for the relays KR that the network for their energization in addition to providing feed points dependent upon the exit relays XR for the exit points, has feed points dependent upon entrance of a train. Thus, it is provided that the circuit network has a feed point comparable to each of the entrance points which is closed when a train passes that point in an established route, and is maintained closed as long as the entering track section to that route is occupied.

If a track switch is operated by auxiliary control, the indications are provided relative to the positions of such track switch in a manner corresponding to that which has been described, energy for the lamps for such indications being supplied to the same circuits used for illumination of such lamps when establishing a route responsive to entrance and exit designation by a contact of the auxiliary control lever SML for that track switch. For example, assume that an operator desires the track switches of crossover 2 to be operated to their reverse positions in accordance with the actuation of the auxiliary switch control lever 2SML. The actuation of that lever to an upper position causes the picking up of the relay 2R for selecting the reverse position of the track switches of the crossover (see Fig. 2) in a manner which has been described, and the picking up of that relay causes the illumination of the light sections 2ARK and 2BRK by the steady energization of the white lamps for such light sections (if the track switches are already in their reverse positions) when energy is applied at contact 327 of lever 2SML (see Fig. 7) to circuits which have been described for the white lamps of those light sections at back contact 305 of relay 9KR. If the track switches of crossover 2 are not already in their reverse positions, the relay 2RCR is dropped away at that time, and the flashing of the white lamps of the light sections 2ARK and 2BRK is effected in a manner which has been described. The relay 9KR is dropped away at that time because a relay KR can be picked up only responsive to entrance and exit designation for the establishment of a route (see Fig. 6). That is, the picking up of a relay KR is dependent either upon the picking up of an exit relay XR in the establishment of a route including that track section, or is dependent upon the dropping away of a route locking relay ES or WS when a train passes the entrance end of an established route including that track section. Therefore, each of the light sections adjacent each of the route ends and between the light sections for indication of switch positions is illuminated by a white lamp only when the relay KR for that track section is picked up (see Fig. 8). Such being the case, the actuation of an auxiliary switch control lever SML causes the illumination of only the light sections directly associated with the indication of the position of that track switch. It is provided, however, that the presence of a train in any track section causes the illumination of the red lamps for the light sections for that track section, irrespective of an established route, except for the light sections used for switch position indication. Such condition will be readily understood with reference to Fig. 8 in which, for example, the presence of a train, or the failure of the track circuit, in track section 3T causes the dropping away of relay 3TR and the illumination of the red lamp 2AN/RK—R for the light section 2AN/RK upon the closing of back contact 311, irrespective of the condition of the relay 3KR for that track section.

The indication circuits provide that a track switch becoming unlocked for some particular reason, such, for example, as being hand cranked by a maintainer, is indicated by the flashing of the white lamp (if the detector track section is unoccupied) for the translucent insert corresponding to the position last called for for that track switch. For example, it is assumed under normal conditions that the position last called for for the track switches of crossover 2 is normal. Under such conditions, assume the track switches of crossover 2 to become unlocked as by being hand cranked from their normal positions. Such operation causes the dropping away of the relay 2WP, and the dropping away of that relay causes the flashing of the white lamp of light section 2ANK by the energization of a circuit closed from (FBX), including back contact 328 of relay 2WP, polar contact 329 of relay 2WZ in a right hand position, back contact 330 of relay 2BN, front contact 331 of relay 3TR, and lamp 2ANK—W, to (CX). At the same time the lamp 2BNK—W is illuminated for light section 2BNK by the energization of a circuit closed from (FBX) including back contact 328 of relay 2WP, polar contact 329 of relay 2WZ in a right hand position, back contact 332 of relay 2AN, front contact 333 of relay 9TR, and lamp 2BNK—W, to (CX). It is believed obvious from the circuits just described that the occupancy of either of the track sections 3TR or 9TR causes the flashing of the red lamp instead of the white lamp for the light section associated with the occupied track section.

*Summary.*—After having considered the organization of the circuits to provide the required mode of operation of the system, several objects of the invention relative to the practical application of the system will be summarized, without attempting to define the scope of the invention.

In practice, it is desirable that the route establishing means respond quickly to entrance and exit designation, so therefore relatively quick acting switch position selecting relays N, AN, BN and R, are used for that part of the system. Because the use of such quick acting relays is practical only with single and double windings, it is required that the completion circuit organization as provided by the present invention be used in preference to the completion circuit organization requiring triple wound relays disclosed, for example, in the patent to A. Langdon, Patent No.

2,148,865, dated February 28, 1939. The circuit organization according to the present invention therefore provides for the energization of one winding of each of the switch position selecting relays dependent upon the establishment of a route for either direction of traffic, and provides for the energization of the other winding by stick circuits and by auxiliary control, and at the same time maintains the desirable feature of the system of energizing the switch position selecting relays in cascade so as to prevent momentary overloads in the switch operating circuits, due to starting several electric switch machines simultaneously.

The use of the stick circuits which have been described for the switch position selecting relays N, AN, BN and R for preventing the preconditioning of routes by the actuation of the auxiliary switch control levers reduces the number of relays required for the system by allowing the use of a lock relay L per track circuit, irrespective of the number of track switches included in that track circuit, and still providing, where there is a plurality of track switches in the same detector track section, that the attempt to precondition one of such track switches by the actuation of the auxiliary switch control lever SML for that track switch, will not interfere with the operation of the other track switch included in that track section. For example, with reference to the track layout illustrated in Fig. 4A, one lock relay L is provided for the track section including switches 3W and 4AW, but the actuation of the auxiliary lever 3SML for switch 3W to attempt to precondition that track switch will not prevent the operation of track switch 4AW as might be required if an operator designates the entrance and exit ends of a route on the lower track requiring the track switches of crossover 4 to be in their normal positions.

The use of the exit repeater relay XP for each of the intermediate signals in preventing faulty operation under certain conditions upon restoration, provides a positive check of the proper restoration of the exit relays XR, such check being independent of the condition of the signal governing entrance to the route being restored. The utility of such a check is more fully realized when the application of the system to complex track layouts having a large number of track switches is considered. Under such conditions energy for an exit relay XR may not come directly from an entrance relay NR, but may come from an intermediate feed point at a front contact of a Y relay to prevent overloading the contacts of the entrance relays. Under such conditions there may be a considerable lapse of time between the restoration of an entrance relay NR for a route and the restoration of the exit relay XR for that route, enough time so that, were it not for the exit repeater relays XP for the intermediate signals, undesired routes might be established under the conditions heretofore considered when describing the restoration to normal of the system.

The circuit organization provided by the present invention for the control of the indicator lamps is unique in that the current required to be broken by any one of the contacts in the lamp circuits is relatively low, thus preventing the arcing and burning of the contacts of the standard type relays employed in practice. The miniature lamps used for indication purposes are of course of the low voltage type and require much more current than the relays, therefore by the use of the special indication relays KR which can be energized in a circuit network without overloading the relay contacts, it is possible to so segregate the lamp circuits that none of the relay contacts will be overloaded. If it were not for the relays KR, it would be required that many of the lamps be energized from a circuit network similar to that provided for the relays KR in order to maintain the desired mode of operation, and, for complex track layouts, many of the relay contacts would necessarily be required to carry above their standard rated amount of current.

It has been pointed out that the indication circuits including the indication relays KR provide a positive means for preventing undesirable flashes of the indicator lamps, irrespective of the timing of the various relays. Such mode of operation is effective because each of the relays KR is dropped away while the red lamps for the corresponding track section are illuminated, and such relay when dropped away prevents the momentary energization of white lamps for that track section when that track relay becomes energized for the extinguishing of the red lamps, prior to the release of that portion of the route by the restoration of the route locking relays. It is provided, however, that, should a route be set up in the rear of a train as for a following train, a true indication of such condition will be provided by the illumination of white lamps, such illumination being effective in accordance with circuit means provided for causing the picking up of the indication relays KR under such conditions.

The indication system provided by this invention provides a more comprehensive picture of the conditions at the track layout by the use of two light sections for the track portions corresponding to each of the crossovers, one light section being associated with the track section at one end of the crossover and the other being associated with the track section at the other end of the crossover. Thus, when a train in passing over the crossover leaves the track section associated with one end, the light section for that end is illuminated by the energization of a white lamp to inform the operator that although the train has passed out of that section, the track switches of the crossover are still locked in their reverse positions. The lamps for the other translucent inserts for the portion of the route extending through the track section which has become unoccupied are extinguished to indicate that restoration for the route has been initiated either manually or automatically, and that such portion can be used for the establishment of other routes, considering, of course, the locked condition of the crossover.

Other features of the indication system reside in the provision of means for indicating track occupancy and track circuit failure when there are no routes established, means for indicating the failure of a switch repeater relay WP, whether the detector track section is occupied or unoccupied, and for indicating the last called for position of that track switch under such conditions.

Having described one embodiment of the present invention as applied to the control of switches and signals for a particular track layout as one specific embodiment of the present invention, it is desired to be understood that this form is selected to facilitate in the disclosure of the invention rather than to limit the number of forms the invention may assume, and it is to be further understood that various alterations, adaptations, and modifications may be applied to the specific form shown to meet the requirements of practice without in any manner departing from the spirit or scope of the present invention except as limited by the appending claims.

What I claim is:

1. In a switch and signal control system of the character described for a track layout providing by power switches a plurality of conflicting routes extending between signal locations constituting entrance and exit points for both directions of traffic; a miniature track diagram of said track layout having disposed thereon control buttons for designation of the respective entrance and exit points; a conditioning relay for each of the track switches; normal and reverse switch control relays for each of the track switches and each relay provided with a single pick-up winding; circuit means responsive to entrance designation for energizing said conditioning relay for each track switch that can be trailed in a normal position in an available route emanating from that entrance point; a completion circuit network for the energization of said normal and reverse switch control relays responsive to exit designation, such circuit network having feed points at its ends corresponding to the respective exit points for both directions of traffic and having circuit portions including contacts of said conditioning relays and said normal and reverse switch control relays effective to energize the single pick-up winding, irrespective of the direction of traffic, for the switch control relay for each track switch corresponding to the required position for such track switch in an available route extending between designated entrance and exit points, such energization being initially effective for but one relay at a time in a cascade manner, starting with a switch control relay for the track switch in the route nearest the designated exit point; and switch operating means responsive to the energization of the normal or the reverse switch position selecting relay for each of the track switches for aligning each route having its entrance and exit ends designated.

2. In a switch and signal control system of the entrance-exit type for the establishment of each desired route extending through a track layout which provides by power switches a plurality of conflicting routes extending between signal locations constituting entrance and exit points for both directions of traffic; a detector track section having a track relay for each of the track switches; manually operable control buttons disposed on a miniature track diagram of said track layout for the designation of the respective entrance and exit points; a conditioning relay for each of the track switches; normal and reverse switch control relays for each of the track switches and each provided with a single pick-up winding and a single stick winding; circuit means responsive to the designation of each of the entrance points for energizing said conditioning relay for each track switch that can be included in a normal position in an available route extending from that entrance point; a completion circuit network for the energization of the pick-up windings of said normal and reverse switch control relays responsive to exit designation, such circuit network having feed points corresponding to the respective exit points for both directions of traffic and having circuit portions including contacts of said conditioning relays and said normal and reverse switch control relays corresponding to the various routes extending through the track layout, such portions being effective responsive to exit designation to energize the single pick-up winding, irrespective of the direction of traffic of the switch control relay for each track switch corresponding to the required position of such track switch to establish an available route extending between designated entrance and exit points, the picking up of such normal and reverse switch control relays being effected in a cascade manner, starting with the switch control relay for the track switch included in the route nearest the designated exit point, no two relays having their circuits closed simultaneously; switch operating means responsive to the energization of a normal or a reverse switch control relay for each track switch in each route for aligning such route; and stick circuit means for energizing said stick winding of the switch control relay for each track switch in an aligned route, such stick circuit means being effective for that track switch as long as such switch is included in the route in advance of the train, and such stick circuit means being restored after passage of the train over that track switch.

3. In a switch and signal control system for railroads for the power operation of a track switch; a detector track section for the track switch having a track relay; a switch control lever having distinctive normal and reverse control positions; a normal and a reverse switch control relay for the track switch; pick-up circuits for said normal and reverse switch control relays effective to energize the normal or reverse relay corresponding to the operated position of said lever, only if the normal or reverse relay for the opposite switch position is de-energized; switch operating means for positioning said track switch in accordance with the normal or reverse switch control relay energized; stick circuit means for each of said normal and reverse relays effective when said track section for that track switch is occupied by a train to maintain energized said normal or reverse switch control relay then energized; and other stick circuit means being effective to maintain said normal or reverse relay energized whenever said switch control lever is in an operating position opposite to the particular switch control relay maintained energized by the first said stick circuit means; whereby a normal or a reverse switch control relay can not be picked up for operation of that track switch to an opposite position responsive to the actuation of said control lever, when said track section becomes unoccupied by a train if such actuation occurred while such track section was occupied.

4. In a switch and signal control system of the character described for the power operation of a track switch, a detector track section having a normally energized track relay for such track switch, a switch control lever having distinctive normal and reverse control positions and a neutral position, a normal and a reverse switch control relay for said track switch, circuit means responsive to the actuation of said switch control lever from its neutral position to its normal or reverse control position for energizing said respective normal or reverse switch control relay, only if the switch control relay for the opposite position is deenergized, stick circuit means effective when said track section is occupied to maintain energized said normal or reverse switch control relay then energized, and normally deenergized stick circuit means rendered effective to maintain said normal or reverse switch control relay energized whenever said switch control lever is actuated to an operating position opposite to the switch control relay then being maintained energized by the occupancy of said track section.

5. In a switch and signal control system of the entrance-exit type for a track layout providing by power track switches a plurality of conflicting routes extending between entrance and exit points, a plurality of detector track sections each having a track relay and associated with the track switches, manually operable contact means for the designation of the respective entrance and exit points, a three position switch control lever for each track switch having normal and reverse control positions and a neutral position, a normal and a reverse switch control relay for each of the track switches, route establishing means responsive to entrance and exist designation for the respective entrance and exit ends of each of the routes for energizing one of said switch control relays, dependent upon the position of the track switch required, for each track switch included in an available route extending between the designated entrance and exit points, circuit means responsive to the actuation of said lever for each of the track switches to its normal or its reverse operating position for energizing said respective normal or reverse relay for that track switch, only if the switch control relay for the opposite position of that track switch is deenergized, stick circuit means effective when a track section is occupied by a train to maintain energized said normal or reverse switch control relay then energized for each track switch in that track section, and stick circuit means for maintaining energized the normal or reverse switch control relay then being maintained energized by said first stick circuit means when said lever for the corresponding switch is moved to an opposite position until said lever is restored to its neutral position although said detector track section for that track switch becomes unoccupied in the meantime.

6. In a switch and signal control system of the character described for a track layout providing by power switches a plurality of conflicting routes extending between entrance and exit points; detector track sections each having a track relay for the track switches; a miniature track diagram of the track layout having disposed thereon manually operable buttons for designation of the respective entrance and exit points; a three-position switch control lever having normal and reverse control positions and a neutral position; normal and reverse switch control relays for each of the track switches; route establishing means responsive to entrance and exit designation by actuation of said buttons for the respective entrance and exit ends of each of the routes for energizing said normal or said reverse switch control relay, dependent upon the position of the track switch required, for each track switch included in an available route extending between the designated entrance and exit points; circuit means responsive to the actuation of said lever for each track switch to its normal or reverse operating position for energizing said respective normal or reverse switch control relay for that track switch, only if the switch control relay for the position of that track switch opposite to that called for is deenergized; switch operating means responsive to the energization of a normal or a reverse switch control relay for each of the track switches for causing the operation of that track switch to a position required in the alignment of a route extending between the designated entrance and exit points; stick circuit means rendered effective upon the complete alignment of each route having its entrance and exit ends designated for maintaining said normal and reverse switch control relays energized for the track switches included in detector track sections occupied by or in advance of a train passing through that route, such stick circuit means being deenergized after the passage of the train through that detector track section; and stick circuit means effective to maintain energized said normal or said reverse switch control relay then energized for each track switch when said lever for that track switch is moved to an opposite operating position until said lever is restored to its neutral position.

7. In a switch and signal control system of the entrance-exit type for a track layout providing by track switches a plurality of conflicting routes extending from an entrance point to exit points within a single interlocked group, a miniaure track diagram having disposed thereon buttons for the manual designation of the respective entrance and exit points, normal and reverse switch control relays for each of the track switches, an exit repeater relay for the entrance point, route establishing means responsive to the designation respectively of the entrance and exit points of each of the routes for selectively energizing said normal and reverse switch control relays to correspond with the required position for each of the track switches in the route having its entrance and exit points designated, and circuit means effective subsequent to the designation of said entrance point, only after said route establishing means has become effective for each track switch included in a route emanating from said entrance point, for picking up said exit repeater relay for that entrance point, whereby the energization of said exit repeater relay indicates that a route has been completely established emanating from that entrance point.

8. In a switch and signal control system of the character described for a track layout having track switches which provide a plurality of conflicting routes emanating from an entrance point to exit points within a single interlocked group, manually operable control buttons on a miniature track diagram for designation of the respective entrance and exit points, an exit relay for each of the exit points, normal and reverse switch control relays for each of the track switches, an exit repeater relay for the entrance point, circuit means responsive to the designation of the exit point of an available route subsequent to the designation of said entrance point for energizing said exit relay for that exit point, route establishing means responsive to the energization of said exit relay for each of the exit points for selectively energizing said normal and reverse switch control relays to correspond with the required position for each of the track switches included in a route extending to that exit point from said entrance point, and circuit means effective subsequent to the designation of said entrance point and after said route establishing means has become effective for each track switch included in a route emanating from said entrance point for picking up said exit repeater relay, such circuit means being effective to maintain such exit repeater relay energized as long as said exit relay remains picked up for the exit point of the route established emanating from that entrance point, whereby the energized condition of any one of the exit relays is indicated by said exit repeater relay as long as that exit relay remains picked up.

9. In a switch and signal control system of the character described for a track layout providing by track switches a plurality of conflicting routes extending from an entrance point to exit points within a single interlocked group; a miniature track diagram of said track layout having disposed thereon buttons for the manual designation of the respective entrance and exit points and for restoration designation; an entrance relay for said entrance point; an exit relay for each of said exit points; an exit repeater relay for the entrance point; normal and reverse switch control relays for each of the track switches; circuit means responsive to the designation of said entrance point for energizing said entrance relay, such circuit means being effective to maintain that relay energized, dependent for restoration upon the manual designation of such restoration by an operator; circuit means responsive to exit designation subsequent to the energization of said entrance relay for an available route extending to that exit point for energizing said exit relay for that point, such circuit means being effective to maintain that exit relay energized, dependent for deenergization upon the restoration of said entrance relay; route establishing means responsive to the contemporaneous energization of said entrance and exit relays for the respective entrance and exit points of each of the routes for selectively energizing said normal and reverse switch control relays to correspond with the required positions for each of the track switches included in that route; and circuit means effective after said route establishing means has become effective for each track switch included in any route emanating from said entrance point for picking up said exit repeater relay for that entrance point, such circuit means being effective to maintain that relay energized, dependent for deenergization upon the dropping away of said exit relay for that exit point; whereby the energization of said exit repeater relay for said entrance point indicates the picked up condition of the exit relay for the exit end of a route emanating from that point.

10. In a switch and signal control system of the character described for a track layout having a plurality of interlocked groups providing through routes past intermediate signals, each of such interlocked groups having track switches providing a plurality of conflicting routes extending between entrance and exit points; a miniature track diagram of the track layout having disposed thereon buttons for manual designation of the respective entrance and exit points; an exit relay for each of the exit points; a normally deenergized exit repeater relay for each of the intermediate signals; normal and reverse switch control relays for each of the track switches; circuit means responsive to entrance designation for an entrance point in one interlocked group for so conditioning for energization each of the exit relays for each of the exit ends of the routes emanating from that point, that such exit relay can be picked up upon the subsequent designation of that exit point, only provided that said exit repeater relay for each of the intermediate signals in such route is deenergized; circuit means for each of the interlocked groups responsive to the energization of each of said exit relays in that interlocked group for selectively energizing said normal and reverse switch control relays to establish a route extending to that exit point from a designated entrance point or a certain intermediate signal within that interlocked group, such circuit means being effective to energize said exit repeater relay for such intermediate signal or designated entrance point after a route has been established from that entrance point to the exit point of that route, and such circuit means being effective to maintain such relay energized, dependent for deenergization upon the deenergization of the exit relay for the exit end of that route within that interlocked group; and through route circuit control means for each of the intermediate signals rendered temporarily effective when said exit repeater relay is energized for that intermediate signal for causing the initial energization of the exit relay for the adjacent exit point of the adjacent interlocked group, provided that intermediate signal is included in a through route having its entrance and exit ends designated.

11. In a switch and signal control system of the entrance-exit type for a track layout providing by power switches a plurality of conflicting routes extending between entrance and exit points, detector track sections for the track switches, a miniature diagram of the track layout on a control panel having its trackway composed of longitudinal translucent inserts for the respective track sections and having manually operable buttons disposed thereon at points corresponding to the respective entrance and exit points for designation of such points; route establishing means including normal and reverse switch control relays for causing the power operation of the track switches to establish any given route having its respective entrance and exit points designated; an indication relay for each of the track sections; circuit means effective upon the establishment of a route to energize said indication relay for each track section included in that route and effective to maintain such relay energized when a train enters that route only for the unoccupied track sections in advance of such train and to release each switch indication relay when its track section is occupied; an indicator lamp for each of the translucent inserts, circuit means effective upon the establishment of a route to energize said indicator lamp for each of the inserts corresponding to such route only when said indication relays for the track sections of that route are energized, certain of said lamps also being dependent for energization upon the energized condition of the associated switch control relays for the switches in said established route.

12. In a switch and signal control system of the character described for a track layout providing by power switches a plurality of conflicting routes extending between entrance and exit points, detector track sections for the track switches, manually operable contact means for designation of the respective entrance and exit points, route establishing means responsive to respective entrance and exit designation for the entrance and exit ends of any given route for selecting that route and causing the power operation of the track switches to establish such route, a normally deenergized indication relay for each of the track sections, circuit means responsive to the operation of said route establishing means to select any given route for initially energizing said indication relay for each track section included in that route until a train enters the route, stick circuit means for maintaining energized said indication relay for each track section in an occupied route in advance of a train only until that track section becomes occupied by such train, thereby restoring said indication relay to its normal deenergized condition as soon as its track section becomes occupied by a train, two normally deenergized indicator lamps one being of a color distinctive from the other, for each of the track sections, circuit means for energizing one of said indicator lamps for each of the track sections only when said indication relay is energized for that track section and such track section is unoccupied by a train, and circuit means for energizing the other of said indicator lamps for each track section only when that track section is occupied by a train, irrespective of the condition of said indication relay for that track section.

13. In a switch and signal control system of the character described for a track layout providing by power switches a plurality of conflicting routes extending between signal locations constituting entrance and exit points; detector track sections for the track switches; manually operable contact means for designation of the respective entrance and exit points; an exit relay for each of the exit points; circuit means responsive to the designation of the exit end of a route subsequent to the designation of the entrance end of that route for energizing said exit relay for that exit point; route establishing means including normal and reverse switch control relays responsive to the energization of each of said exit relays for causing the power operation of each of the track switches to set up a route extending from a designated entrance point to that exit point; route locking means including route locking relays for each of the track sections effective for each of the track sections in each of the established routes when the signal for that route is cleared to maintain the track switches in such track sections locked, said route locking means being restored when said signal is put to stop before said route becomes occupied; an indication relay for each of the track sections; a circuit network controlled by said switch control relays for the energization of said indication relays having circuit portions comparable to the various different portions of the routes extending through the track layout and feed points at its ends corresponding to the respective exit points, and energized when the corresponding exit relay is energized, and such circuit network having each of said indication relays connected thereto at a point comparable to a point for the respective track section common to all possible routes extending through that section; and stick circuit means effective to maintain each of said indication relays energized when said route locking means is effective for that track section, only if such track section is unoccupied by a train; whereby each of said indication relays is picked up when that track section is included in a route selected by said route establishing means, and is maintained energized dependent upon the route locking in advance of the train until that track section becomes occupied or the route locking means for the track switches in that track section is restored.

14. In a switch and signal control system of the entrance-exit type for a track layout providing by track switches a plurality of conflicting routes extending between entrance and exit points, detector track sections and track relays for the track switches, manually operable control buttons for designation of each of the respective entrance and exit points, route establishing means including normal and reverse switch control relays responsive to the designation of the entrance and exit ends respectively of each of the routes for causing the power operation of the track switches to establish such route, an indication relay for each of the track sections, a circuit network for the energization of each of said indication relays having circuit portions connected by the energization of said switch control relays to conform with the various routes extending through the track layout and having feed points at its ends corresponding to the respective entrance points of the track layout, such feed points being energized and thereby energizing the portions of the network conforming with an established route upon entrance of a train into that route and to maintain such circuit portions energized as long as the train occupies that entering track section, and such circuit network having each of said indication relays connected thereto through a front contact of the corresponding track relay at a point comparable to a point in the corresponding track section which is common to all possible routes extending through that section in such a manner as to cause that relay to be energized when the circuit portion to which it is connected is energized unless the corresponding track section is occupied.

15. In a switch and signal control system of the entrance-exit type for the establishment by manual designation of the respective entrance and exit ends of each route desired to be established extending through a track layout providing by power switches a plurality of conflicting routes extending between entrance and exit points; detector track sections for the track switches; route establishing means responsive to entrance and exit designation of the ends of any given available route for causing the power operation of each of the track switches required to establish such given route; rear release route locking means rendered effective by the clearing of a signal for an established route to maintain locked each track switch in that established route in advance of a train or in a detector track section occupied by a train, but releasing such respective track switches as their detector track sections become unoccupied in the rear of a train passing through the route; an indication relay for each of the track sections; circuit means for initially energizing said indication relay for each track section included in an established route, stick circuit means for each indication relay controlled by said route locking means and responsive to the occupancy of the corresponding track section for maintaining the indication relay energized for each track section in advance of a train passing through the route only until its track section becomes occupied, an indicator lamp for each of the track sections, circuit means for energizing said indicator lamp when that track section is unoccupied by a train and said indication relay for that track section is energized.

16. In a switch and signal control system of the character described for a track layout having a crossover providing a plurality of conflicting routes extending between entrance and exit points; a detector track section for each end of the crossover; detector locking circuit means effective to lock the track switches of the crossover in the reverse position whenever either of the detector track sections is occupied by a train; a miniature diagram of the track layout in which the crossover is represented by two linear light sections, one associated with the detector track section at each end of the crossover, such track diagram having manually operable buttons disposed thereon at positions corresponding to the respective entrance and exit points for manual designation of such points; route establishing means including normal and reverse switch control relays for the crossover responsive to the designation of the respective entrance and exit ends of each of the routes for causing the power operation of the track switches of the crossover to establish such route, two indicator lamps for each of the light sections, one being of a color distinctive from the other, circuit means rendered effective by the energization of said reverse switch control relay for lighting the indicator lamp of one color for both of said lighting sections when a route is established over the crossover in the reverse position but neither of said track sections is occupied, said circuit means also lighting the indicator lamp of said one color for the end of the crossover in the rear of the train only while said train is occupying the track section for the other end of the crossover and the track switches of the crossover are locked by said detecting locking means; and circuit means for energizing the other of said indicator lamps for each of the light sections whenever that track section is occupied by a train.

17. In a control system of the entrance-exit type for governing the power operation of a track switch to establish different routes between entrance and exit points, a detector track section associated with said track switch and provided with a track relay, manually operable control buttons for the entrance and exit points, an auxiliary control lever for said track switch having a neutral position and normal and reverse operated positions, a normal and a reverse switch control relay for said track switch, route establishing means acting in response to the operation of the control buttons for the entrance and exit ends of any particular route for energizing the normal or reverse switch control relay for said track switch as required to establish that route providing the switch control relay for the opposite position is deenergized, circuit means effective upon the actuation of said auxiliary control lever from its neutral position to its normal or reverse control position to energize the respective normal or reverse switch control relay providing the switch control relay for the opposite position is deenergized, said means ceasing to be effective as soon as said lever is returned to its neutral position, stick circuit means effective when said track section becomes occupied to maintain energized the normal or reverse control relay then picked up, and other stick circuit means effective, if said auxiliary control lever is actuated from its neutral position to a normal or reverse operated position out of correspondence with the normal or reverse switch control relay then picked up by reason of energization by said route establishing means or said stick circuit while a train is in said detector track section, to maintain energized such normal or reverse switch control relay until said lever is restored to its neutral position, whereby a normal or reverse switch control relay cannot be prepared for energization by movement of said control lever for operating said track switch to a new position if said control lever is operated either while said route establishing means is effective or while a train is on the associated detector track section.

18. In a control system for the power operation of a track switch, a detector track section having a normally energized track relay, a switch control lever having a neutral position together with normal and reverse operated positions, a normal and a reverse switch control relay for governing the power operation of said track switch, circuit means effective upon the actuation of said switch control lever from its neutral position to its normal or reverse operated position to energize the respective normal or reverse switch control relay providing the switch control relay for the opposite position is deenergized, said means ceasing to be effective as soon as said lever is returned to its neutral position, stick circuit means controlled by said track relay and effective when said track section becomes occupied by a train to maintain energized the normal or reverse switch control relay then picked up, and other stick circuit means effective, if said switch control lever is actuated from its neutral position to a normal or reverse operated position out of correspondence with the normal or reverse switch control relay then picked up, to maintain energized such normal or reverse switch control relay until said lever is restored to its neutral position.

19. In a switch and signal control system for track layouts including a plurality of interlocked groups and affording one or more through routes past one or more intermediate signals, manually operable control buttons for designating any given signal location of said track layout as an entrance or an exit point, an exit relay for each of said exit points, an exit repeater relay for each of said intermediate signals, a preselecting relay for each of the track switches of said track layout, normal and reverse switch control relays for each of the track switches, initiating circuit means responsive to the actuation of a control button to designate an entrance point for energizing said preselecting relay for each track switch that would be trailed in a normal position in an available route or through route originating at that entrance point and at the same time conditioning for energization the exit relay for the exit ends of each of such routes or through routes, circuit means effective upon the actuation of a control button to designate an exit end of one or such available routes or through routes for energizing its associated exit relay providing it is conditioned for energization, completion circuit means rendered effective upon the picking up of the exit relay for the exit end of an available route to effect the energization of the normal or reverse switch control relays as required to establish that route and in the case of a through route acting to energize an exit repeater relay for an intermediate signal to act on the exit relay for the adjoining interlocked group the same as if a control button had been actuated therefor, said completion circuit means acting to maintain energized said exit repeater relay for said intermediate signal location until said exit relay for the exit end of the route is released, and circuit means controlled by said exit repeater relay at an intermediate signal location for interrupting the connection between the initiating circuits for the adjoining interlocked groups until the exit relay for the exit end of the route in the corresponding interlocked group has been dropped away.

20. In a switch control system for a track layout having power operated track switches to set up different routes between signal locations constituting entrance and exit points for governing traffic in both directions over such routes, control buttons associated with said signal locations for designating the respective locations as entrance and exit points; a preselecting relay for each of the track switches; normal and reverse switch control relays for each of the track switches, each of such relays having but a single pick-up winding; circuit means responsive to the actuation of a control button to designate a signal location as an entrance point for energizing the preselecting relay for each track switch that would be trailed in a normal position for each of the available routes originating at the corresponding entrance point; a completion circuit network for the energization of said normal and reverse switch control relays responsive to the actuation of a control button to designate the exit end of one of such available routes comprising feed points for said network corresponding to the respective exit points for both ends of said track layout and circuit portions interconnecting said feed points and said switch control relays, which circuit portions include contacts of said preselecting relays and contacts of said switch control relays effective to complete circuits for the energization of the single pick-up winding for the control relay for each switch of any given route corresponding to the position required for such switch to set up that route extending between the designated entrance and exit points, such energization being initiated from the feed point corresponding to the designated exit point of the given route and effective to energize such relays in sequence one relay at a time in a cascade manner starting with the switch control relay for the track switch of the given route nearest the designated exit point; and switch operating means for each of said track switches responsive to the energization of the normal or reverse switch control relay for that track switch for operating it to a corresponding normal or reverse position.

21. In a switch and signal control system of the entrance-exit type for railroad track layouts including insulated track sections interconnected by track switches to form different traffic routes, a track relay for each of said track sections, a miniature track diagram of said track layout having visual indicating means for illuminating a portion of each of said track sections, an indication relay associated with each track section for governing the corresponding indicating means, manually operable buttons on said track diagram designating the ends of desired routes, normal and reverse switch control relays for each switch for governing the power operation thereof to a corresponding normal or reverse position, route establishing means responsive to the manual operation of said buttons to designate the entrance and exit ends of an available route for energizing the normal or the reverse switch control relays of the appropriate switches as required to establish that route, circuit means controlled by said switch control relays and by said track relays for energizing the indication relay for each track section included in a route selected by said route establishing means and for deenergizing said indication relay for each track section in said route when it becomes occupied by a train traversing that route, and means including said circuit means for re-energizing said indication relay for a remote track section in said route when a train having entered that track section reverses its direction of movement, whereby said indicating means is rendered effective by the energization of said indication relays to indicate track sections not occupied but included in an established route and not available for other routes.

22. In a switch and signal control system for a railroad track layout including at least one power operated switch, a miniature track diagram including a normal indicator and a reverse indicator for illuminating portions of the represented track adjacent the switch points to show the position thereof, normal and reverse switch control relays for operating the switch to a corresponding normal or reverse position, route establishing means responsive to the designation of the entrance and exit end of any given available route including said switch for energizing the normal or the reverse switch control relay as required to provide such route, an auxiliary switch control lever manually operable from a neutral position to a normal or reverse position for energizing the corresponding normal or reverse switch control relay, contacts closed by movement of said auxiliary lever from its neutral position to either operated position, normally deenergized normal and reverse correspondence relays respectively energized when the switch is in a normal or a reverse position corresponding with the switch control relay then energized, a flash bus intermittently energized, circuits for connecting said indicators respectively to said flash bus for intermittent energization thereof, each of said circuits including a front contact of the corresponding switch control relay and a back contact of the corresponding correspondence relay, and circuits for steadily energizing said indicators including said contacts of the auxiliary lever and front contacts of the corresponding switch control and correspondence relays.

23. In a switch and signal control system of the entrance-exit type for governing the power operation of track switches over a railroad track layout, a miniature track diagram of the track layout including visual indicating means associated with each switch to show when it is being operated, route establishing means responsive to the manual designation of entrance and exit ends of any desired available route for causing power operation of the appropriate switches to the positions required to provide such route, means for controlling the energization of said indicating means for each switch while it is being operated under the control of said route establishing means, a flash bus intermittently energized, a switch position indicating relay for each switch energized only if that switch is operated and locked in a normal or a reverse position, and circuit means for connecting said indicating means for a switch to said flash bus when its switch position indicating relay is deenergized.

24. In a switch and signal control system of the entrance-exit type for governing the power operation of track switches of a railroad track layout, a miniature track diagram of the track layout including normal and reverse indicators associated with each switch for illuminating portions of the represented track adjacent the switch to show the normal and reverse positions thereof, manually operable buttons on said track diagram, route establishing means responsive to the operation of said buttons to designate the entrance and exit end of any given available route for causing a power operation of the track switches as required to provide such route, a flash bus intermittently energized, a switch position indicating relay for each switch energized only if that switch is operated and locked in a normal or reverse position and closing normal or reverse contacts in accordance with the position of said switch, circuit means controlled by said route establishing means and by said normal and reverse contacts of said switch position indicating relays to energize the normal or reverse indicator for each switch included in a route from said flash bus until that switch has operated to the position required for that route, and means for governing the energization of said indicators for each switch from said flash bus when the switch position indicating relay for that switch is deergized.

25. In a switch and signal control system of the entrance-exit type for railroad track layouts comprising, track sections interconnected by track switches to form different traffic routes, a miniature track diagram of said track layout having indicator strips for said track sections, indicating lamps for illuminating each indicator strip with either of two different colors, manually operable buttons on said track diagram at points corresponding with signal locations constituting the entrance and exit ends of routes, route establishing means responsive to the manual operation of said buttons to designate the entrance end and the exit end of any given route for selecting that route and causing power operation of the track switches as required to establish such route, circuit means responsive to the operation of said route establishing means to select a route for lighting the indicating lamp of one color for each of the track sections included in that selected route and for maintaining such lamp lighted for each track section in advance of a train traversing said route, means responsive to the entrance of a train into each of said track sections for lighting a corresponding indicating lamp of the other color to show occupancy of said track section, and relay means associated with each of said track sections and responsive to the entrance of a train into such track section for rendering said circuit means ineffective to light a corresponding indicating lamp of said one color while said track section is occupied and when a train leaves that track section until that track section is again included in some route selected by operation of the route establishing means.

26. In a switch and signal control system for track layouts comprising detector track sections each having a track relay and interconnected by track switches to form a plurality of routes, certain of said routes including a plurality of detector track sections, a miniature track diagram of said track layout including indicating lamps for illuminating each detector track section with one color to show that such track section is included in a selected route and with a different color to show such track section is occupied by a train, normal and reverse switch control relays for each switch for governing the power operation thereof to corresponding normal and reverse positions, manually operable buttons located on said track diagram at points corresponding with signal locations constituting the entrance and exit ends of routes, route establishing means responsive to the manual operation of buttons to designate the entrance and exit ends of any given available route for energizing the normal or reverse switch control relays of the appropriate switches as required to establish such route, means including a circuit network governed by said switch control relays and the track relays of said detector track sections and energized at feed points corresponding to the exit ends of routes as selected by the route establishing means for governing the lighting of the indicating lamps of said one color, said means acting to light the indicating lamp of said one color for each track section included in a route selected by operation of the route establishing means and maintaining such light lighted for each track section in advance of a train traversing the route, said means also acting to extinguish the indicating lamp of said one color for each of said track sections of a route in turn when that track section becomes occupied by a train traversing the route and until that track section is again included in a route selected by the route establishing means, and circuit means governed by the track relay of each track section for lighting the corresponding indicating lamp of said other color while that track section is occupied by a train.

THOMAS J. JUDGE.